(12) United States Patent
Duncan et al.

(10) Patent No.: US 9,240,628 B2
(45) Date of Patent: *Jan. 19, 2016

(54) MULTI-ELEVATIONAL ANTENNA SYSTEMS AND METHODS OF USE

(71) Applicant: Elwha, LLC, Bellevue, WA (US)

(72) Inventors: William D. Duncan, Kirkland, WA (US); Roderick A. Hyde, Redmond, WA (US); Jordin T. Kare, Seattle, WA (US); Lowell L. Wood, Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/915,425

(22) Filed: Jun. 11, 2013

(65) Prior Publication Data

US 2014/0361939 A1 Dec. 11, 2014

(51) Int. Cl.
*G01S 13/90* (2006.01)
*H01Q 1/28* (2006.01)
*H01Q 1/30* (2006.01)

(52) U.S. Cl.
CPC . *H01Q 1/288* (2013.01); *H01Q 1/30* (2013.01)

(58) Field of Classification Search
CPC ......... H01Q 1/30; H01Q 1/285; H01Q 1/288; G01S 13/90; G01S 13/9035
USPC ............................................ 343/707; 342/25
See application file for complete search history.

(56) References Cited

U.S. PATENT DOCUMENTS

| | | |
|---|---|---|
| 3,680,129 A | 7/1972 | Darrah et al. |
| 3,976,937 A | 8/1976 | Hearn |
| 5,117,400 A | 5/1992 | Penn et al. |
| 5,239,474 A | 8/1993 | Eaton, Jr. et al. |
| 5,245,347 A * | 9/1993 | Bonta et al. .................... 342/149 |
| 5,927,648 A * | 7/1999 | Woodland ................... 244/118.1 |
| 6,215,458 B1 * | 4/2001 | Aguttes et al. ................ 343/915 |
| 6,937,778 B2 | 8/2005 | Winfield et al. |
| 7,511,654 B1 | 3/2009 | Goldman et al. |
| 2003/0020648 A1 * | 1/2003 | Fienup .................. G01S 7/4004 342/25 F |
| 2003/0066932 A1 | 4/2003 | Carroll |
| 2003/0218565 A1 | 11/2003 | Budic |
| 2005/0017721 A1 | 1/2005 | McCracken et al. |
| 2007/0007966 A1 | 1/2007 | Meyer |

(Continued)

OTHER PUBLICATIONS

PCT International Search Report; International App. No. PCT/US2014/041953; Oct. 6, 2014; pp. 1-3.
PCT International Search Report; International App. No. PCT/US2014/041943; Oct. 6, 2014; pp. 1-4.

(Continued)

*Primary Examiner* — Timothy A Brainard

(57) ABSTRACT

The present disclosure provides systems and methods associated with an antenna system comprising a tension member configured to be towed by an aerial platform and/or secured to an orbiting satellite. In some embodiments, a first end of the tension member may be secured to the aerial platform and the second end may extend unsecured from the aerial platform at a different elevation than the first end. A plurality of antenna assemblies, each comprising at least one antenna, may be secured to and spaced along the length of the tension member. Each of the plurality of antennas may be adapted for use with a particular frequency or frequency bandwidth. For example, each of the plurality of antennas may be adapted or tuned for one or more frequencies useful for synthetic aperture radar (SAR). In some embodiments, a receiving system, a communication link, and/or an antenna location system may be utilized.

42 Claims, 27 Drawing Sheets

(56) References Cited

U.S. PATENT DOCUMENTS

| | | |
|---|---|---|
| 2009/0140939 A1 | 6/2009 | Bongfeldt et al. |
| 2009/0273509 A1 | 11/2009 | Fullerton |
| 2010/0256841 A1 | 10/2010 | Garrec et al. |
| 2010/0289717 A1 | 11/2010 | Arslan et al. |
| 2011/0006944 A1 | 1/2011 | Goldman |
| 2011/0163912 A1 | 7/2011 | Ranney et al. |
| 2012/0019407 A1 | 1/2012 | Lesturgie |
| 2012/0098697 A1 | 4/2012 | Paek et al. |
| 2012/0313823 A1 | 12/2012 | Armstrong et al. |
| 2013/0027241 A1 | 1/2013 | Sego et al. |
| 2013/0073775 A1 * | 3/2013 | Wade et al. .................. 710/316 |

OTHER PUBLICATIONS

Towed Array Sonar Systems (http://www.intechopen.com/source/pdfs/18868/InTech-Introduction_to_synthetic_aperture_sonar.pdf) [website accessed Jun. 13, 2013].

Surtass LFA (low frequency active) (http://en.wikipedia.org.wiki/Surveillance_towed_Array_Sensor_System) [website accessed Jun. 13, 2013].

Stehle, R.H., Desbrisay, G.A., Whitson, A.L., Hagn, G.H., "RELEDOP: a full-scale antenna pattern measurement system for high-powered HF transmitting antennas" (http://ieeexplore.ieee.org/stamp/stamp.jspstp=&arnumber=1438&isnumber=94 [website accessed Jun. 13, 2013].

* cited by examiner

MULTI-ELEVATIONAL ANTENNA SYSTEMS AND METHODS OF USE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/915,418, titled MULTI-ELEVATIONAL ANTENNA SYSTEMS AND METHODS OF USE, naming William D. Duncan, Roderick A. Hyde, Jordin T. Kare, and Lowell L. Wood as inventors, and filed Jun. 11, 2013, is related to the present application.

U.S. patent application Ser. No. 13/915,422, entitled MULTI-ELEVATIONAL ANTENNA SYSTEMS AND METHODS OF USE, naming William D. Duncan, Roderick A. Hyde, Jordin T. Kare, and Lowell L. Wood as inventors, and filed Jun. 11, 2013, is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to aerial antenna systems. More specifically, this disclosure relates to systems and methods for securing a plurality of antennas at differing elevations to an aerial platform. Specific applications of the antenna systems as they pertain to synthetic aperture radar are also provided.

SUMMARY

The present disclosure provides various systems and methods useful for radio communications, radiolocation, and/or radar techniques. For example, an antenna system as described herein may be used in synthetic aperture radar (SAR) systems for combining SAR data into an image. Spaceborne and/or airborne synthetic aperture radar (SAR) systems may utilize various techniques for combining SAR data into an image. In some embodiments, multiple-pass SAR imaging utilizes SAR images acquired on motion paths separated in elevation and/or direction. The SAR images from the varying elevations and/or directions are then synthesized to improve elevational resolving power. Accordingly, three-dimensional (3D) imaging and/or mapping may be performed using data obtained from an antenna on an aerial platform moved over a target surface at multiple elevations. This may be useful for terrain mapping, analysis, object detection, and/or classification of objects.

In some embodiments, an antenna system may be towed by an aerial platform or secured to an orbiting satellite. The antenna system may include a tension member, such as a cable, having a first end and a second end. The first end may be secured to the aerial platform and the second end may extend unsecured from the aerial platform at a different elevation than the first end. A plurality of antenna assemblies may be secured to and spaced along the length of the tension member. Each antenna assembly may include one or more antennas. Each of the antennas may be adapted for use with a particular frequency, frequency band, frequency range, and/or frequency bandwidth. For example, each of the antennas may be adapted or tuned for one or more frequencies useful for SAR or other radio or radar technique(s). Since the second end of the tension member is unsecured to the aerial platform and extends at a different elevation than the first end, each of the antennas may be located at a different elevation while the aerial platform is in motion. The tension member may be, for example, between 2 and 2000 wavelengths of an antenna's tuned frequency. Longer tensions members may be useful in some applications, such as high frequency systems. Shorter tension members, such as those using antennas spaced by less than a quarter wavelength, may also be utilized.

The antenna system may receive and/or transmit electromagnetic energy using the plurality of antennas secured to the tension member at various elevations. In some embodiments, signals may be coupled to and/or from the antenna locations via a signal carrier. For example, an optical fiber may function as a signal carrier to convey data between a receiving system and an attached antenna. In various embodiments, power may be supplied to active devices attached to the tension member, such as active electronic circuits associated with the antenna assemblies. The power may be supplied without affecting the performance characteristics of the antennas.

In some embodiments, a receiving system may be communicatively connected to each of the plurality of antennas via one or more communication links. For example, an optical cable extending adjacent to, entwined with, or integrated with the tension member may communicatively connect each of the plurality of antennas or antenna assemblies to a receiving system. The receiving system may be a data storage system configured to store information associated with received electromagnetic energy. In other embodiments, the receiving system may re-transmit (e.g., for subsequent storage or processing) the electromagnetic energy received by the antennas. The plurality of antennas may be communicatively connected to a receiving system (e.g., a storage system, a processing system, a re-transmission system, etc.) via a wireless connection, an optical fiber, an electrical conductor, and/or other communication technique or medium.

In various embodiments, precise knowledge and/or control of the spatial positions and/or orientations of the antennas relative to each other or to the aerial platform may be utilized, for example, to enable coherent processing of SAR signals. Various devices and systems may be used to determine the positions of the antennas. In some embodiments, the tension, curvature, displacement, or other properties of the tension member may be measured. In some embodiments, the position and/or motion of the antenna system may be controlled as it is towed behind the aerial platform.

In various embodiments, SAR data may be processed to generate a 3D image and/or mapping of a target surface area. Additionally, various devices and systems may be utilized to detect, control, and/or compensate for the curvature and/or displacement of the tension member as it is towed behind an aerial platform and/or the relative location of antennas secured to the tension member. In addition to SAR processing, the antenna systems and methods described herein may be utilized for a wide variety of spatial signal processing and other radio techniques.

DETAILED DESCRIPTION

Figure 1:
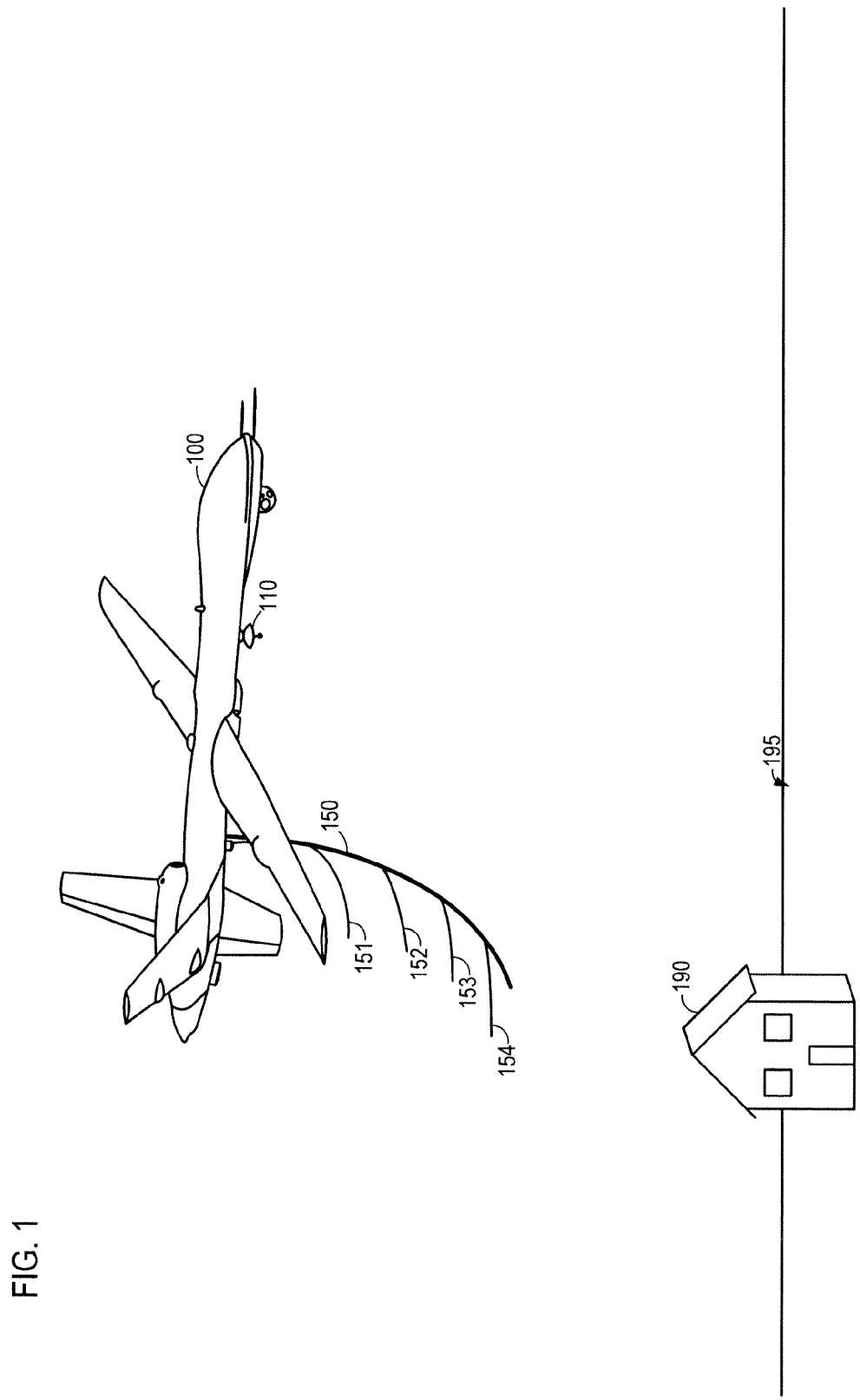
FIG. 1 illustrates a tension member secured to an aerial platform, including multiple antenna assemblies extending from and spaced along the tension member.

Some radar techniques, such as synthetic aperture radar (SAR) and other radio processes, may utilize data gathered from multiple elevations and/or at multiple locations to determine information about a surface or object reflecting or emitting a radio frequency (RF) or other signal(s). For example, SAR may be used for ground mapping, object detection, subterranean mapping, sub-foliage mapping, target identification, and the like. SAR processors may coherently combine amplitude and phase information of electromagnetic energy reflected by a surface. The electromagnetic energy may originate from a plurality of sequentially transmitted pulses, such as from a transmitter on a moving aerial platform. A SAR image may be formed from the coherent combination of the amplitude and phase returns from each location the aerial platform travels. The coherently processed electromagnetic energy allows an image or mapping to be generated that would be comparable to a system with a much larger antenna corresponding to approximately the distance traveled by the aerial platform. By combining signals received from multiple elevations, it is possible to generate 3D images or mappings of surface areas.

In some embodiments of the presently described systems and methods, an antenna system may be towed by an aerial platform or secured to an orbiting satellite. The antenna system may include a tension member, such as a cable, having a first end and a second end. The first end may be secured to the aerial platform and the second end may extend unsecured from the aerial platform at a different elevation than the first end. A plurality of antennas or antenna assemblies may be secured to and spaced along the length of the tension member. Each antenna assembly includes one or more antennas. Each of the antennas may be adapted for use with a particular frequency or frequency bandwidth. For example, each of the antennas may be adapted or tuned to the same frequency, various frequencies, and/or a frequency bandwidth useful for SAR, other interferometric processes, and/or other radio process. Since the second end of the tension member is unsecured to the aerial platform and extends at a different elevation than the first end, each of the antennas may be located at a different elevation relative to the aerial platform. The length of a tension member may vary based on a particular application. For some radio processes (such as SAR and other interferometric processes), the tension member may be hundreds or even thousands of meters long. In other embodiments, the length of the tension member may be a fraction of a wavelength of an associated antenna's tuned frequency bandwidth. In some embodiments, the tension member may be between 2 and 2000 wavelengths of an antenna's tuned frequency. Thus, depending on the frequency used, the length of the tension member may be several thousand meters. Longer lengths may be useful in spaceborne applications or as is found useful and practical.

In some embodiments, an antenna system may include multiple tension members, each configured with a plurality of antennas. In such an embodiment, each tension member may be spaced from the other tension members in an in-track (fore and aft) direction, a cross-track (lateral or left to right) direction, and/or at a unique orientation. The configuration of a plurality of antenna assemblies on a tension member may be configured to receive and/or transmit electromagnetic energy. The electromagnetic energy may be transmitted to and/or received from a distinct region (i.e., directed). Additionally or alternatively, each of the antenna assemblies may be directed at the same area, overlapping but distinct areas, and/or completely distinct areas. Thus, a plurality of antennas associated with a tension member, or even a plurality of tension members, may be configured to operate independently of one another or to operate cooperatively. For example, the plurality of antennas or pluralities of antennas on multiple tension members may be configured to operate as a directional array.

In some embodiments, various types of antennas or antenna configurations may be used on the same tension member. For example, two different sets of antennas may be configured to operate in two different frequency bands (i.e. one antenna set in each frequency band). In another embodiment, two different types of antennas may operate in the same frequency band, but with a first subset of the antennas operating as low directivity antennas and a second subset of the antennas operating as high-gain directional antennas.

The antenna system may receive and/or transmit electromagnetic energy using the plurality of antennas secured to the tension member at various elevations. In some embodiments, a receiving system may comprise a storage system and/or a processing system. Accordingly, each of the plurality of antennas may be communicatively connected to a storage and/or processing system via a communication link.

In various embodiments, the antennas in communication with the receiving system may be said to be connected via a communication link. The communication link may be relatively simple (e.g., an optical fiber or conductor) or more complex (e.g., a wireless protocol or robust network). For example, the communication link may include one or more optical cables extending adjacent to, entwined with, or integrated with the tension member connecting each of the plurality of antennas to the receiving system. In some embodiments, the communication link may utilize an out-of-band wireless network configured to transmit information between each of the plurality of antennas and a receiving system and/or transmitter. The communication link may include a coaxial cable, a shielded cable, and/or another suitable network cable.

According to various embodiments, the tension member may be constructed of any of a wide variety of materials or combination of materials capable of providing sufficient support for the plurality of antenna assemblies and the overall length of the tension member itself. Such materials include, but are not limited to, carbon fibers, glass fibers, nylons, metals, polypropylene, polyester, polyethylene, aramids, acrylics, and plastics. The tension member may include a conductive material and/or a dielectric material. In some embodiments, the tension member may comprise a conductive member divided by a plurality of insulating members spaced along the length of the tension member. In such an embodiment, the tension member may be divided into a plurality of segments of electrically conductive material separated from one another by an insulating member. In some such embodiments, each of the plurality of segments may be non-resonant to relevant frequencies, so as not to interfere with a radar process or communications systems. In some embodiments, the tension member may include one or more strands or sub-members.

In some embodiments, a communication system may include an optical cable connecting each of the plurality of antennas along the length of the tension member to a receiving system and/or transmitter. In some embodiments, the optical cable may extend alongside the tension member and/or be entwined with strands of the tension member.

According to various embodiments, the tension member may be deployed from an aerial platform while the aerial platform is in motion. For example, a winch-style mechanism may uncoil a tension member from a moving aerial platform. Each of a plurality of antenna assemblies may be selectively secured to the tension member as the tension member is deployed. Likewise, each of the plurality of antenna assemblies and/or antennas may be selectively detached from the tension member as the tension member is retracted.

In an alternative embodiment, each of the plurality of antenna assemblies may be secured to the tension member while in a retracted state. In such an embodiment, as the tension member is deployed, each of the plurality of antenna assemblies may extend and/or otherwise transition to a deployed position with respect to the tension member. As the tension member is retracted, each of the plurality of antenna assemblies may retract and/or otherwise transition to a retracted position (i.e., storage position) with respect to the tension member.

In some embodiments, one or more control devices, such as end masses, airfoils, wings, fins, flaps, drag cones, and/or propulsion devices, may be used to control the shape of the tension member and/or the location of the second end of the tension member. In some embodiments, one or more control devices may be actively driven and/or powered or passively controlled by an airstream. Control devices, receiving systems, transmitters, communication systems, and/or other devices associated with an antenna system may be powered using a generator, a turbine, a battery, an optical cable, a free-space optical power system, a power cable extending along or entwined with the tension member, a solar panel, and/or another mobile power apparatus.

In some embodiments, an electrical conducting cable and/or the tension member may comprise a plurality of filters and/or resonant traps configured to divide the electrical conducting cable and/or the tension member into a series of electrical lengths configured to not interact electromagnetically with the antennas within a predetermined frequency bandwidth. For example, a conductive communications cable and/or a tension member may include a ferrite core, ferrite components, one or more inductors, and/or another device capable of forming filters and/or resonant traps. In some embodiments, the electrical conducting cable and/or the communication system may include a coaxial cable.

In some embodiments, the tension member, a connectivity cable of a communication system, and/or another component within the antenna system may include a dampening system configured to dampen mechanical oscillations. For example, one or more control devices may be positioned along the length of the tension member to dampen oscillations.

The antenna system may further include an antenna location system configured to determine a location (e.g., an absolute location, an elevation, and/or displacement) of each of the plurality of antennas (or antenna assemblies) relative to the aerial platform, relative to a receiving system, relative to a transmitter, and/or relative to one another. Depending on the calculations performed on data collected using the plurality of antennas, it may be useful to know the absolute or relative position (e.g., in-track or cross-track) of each of the plurality of antennas. In one embodiment, an antenna location system may include a curvature sensing optical fiber system configured to determine the curvature of the tension member at one or more locations along the length of the tension member. This information, combined with the spacing of each antenna along the tension member of a known total length, may allow for accurate positional data to be determined for each of the plurality of antennas. The location of an antenna may be defined with respect to the phase center of the antenna.

In one embodiment, the antenna location system may be configured to utilize a tension of a tension member, a tensile modulus of the tension member, a coefficient of expansion, a temperature of the tension member, an imaging device, electromagnetic illumination (visible or not) (e.g., flash, strobe, continuous), a reflector, a retroreflector, a global positioning system (GPS), a local positioning system (LPS), interferometry of an RF signal, an optical signal, an acoustic or ultrasonic signal, inertial sensors, and/or another sensor device to determine the relative and/or absolute location of each of a plurality of antennas along a tension member. In some embodiments, the location of some of the plurality of antennas may be determined and the location of the other antennas may be estimated based on the known location of an end of the tension member and/or the location of some of the plurality of antennas.

An antenna location system may be configured to utilize the location and/or spatial orientation of one or more antennas. Location and/or spatial orientation may be determined using optical imaging (including infrared or ultraviolet imaging), stereo imaging, RF or microwave interferometry, LIDAR or imaging LIDAR (i.e., optical time-of-flight sensing), acoustic or ultrasonic sensing, a Global Positioning System (GPS), differential GPS, or GPS carrier phase sensing, inertial sensing (accelerometers, gyroscopes). The system may utilize known positions or distances, such as the length of the tension member between two antenna assemblies, and corrections to such known positions or distances, such as corrections to the length of the tension member based on, e.g., sensed tension in the tension member and a known tensile modulus of the tension member, or sensed temperature of the tension member and a know coefficient of expansion of the tension member. In some embodiments, the effective location (phase center) of an antenna may be determined at least in part by measurement of one or more calibration signals received or transmitted by the antenna.

One or more of the antennas in an antenna system as described herein may be an active antenna or a passive antenna. Examples of antennas include, but are not limited to, dipole antennas, Yagi-Uda antennas, horn antennas, planar waveguide antennas, bicone antennas, parabolic reflectors, and/or any other type of antenna capable of receiving and/or transmitting RF frequencies. The antennas may be configured and/or selected to minimize aerodynamic drag. The plurality of antennas may include various subsets of antennas, where each subset is configured to receive and/or transmit frequencies within a unique bandwidth. The bandwidths may comprise single frequencies, narrowband frequency ranges, broadband frequency ranges, or multiple bands of non-contiguous frequencies.

In some embodiments, the antennas may comprise planar antennas, flat antennas, conformal antennas, flat antennas, and/or the like. For example, in one embodiment, electronically steerable antennas may be utilized. The electronically steerable antennas may or may not be physically steerable. Rather, the antennas may be electronically controllable to adjust the beam angle and/or direction. For example, an antenna may utilize metamaterials surface antenna technology (MSA-T) to form an electronically steerable antenna.

Antennas may be configured to transmit and/or receive a range of electromagnetic energy between approximately 10 kilohertz and 300 gigahertz. For example, an antenna system may be configured with one or more antennas configured to receive and/or transmit electromagnetic energy between 3 megahertz and 30 megahertz, 30 megahertz and 300 megahertz, 300 megahertz and 3 gigahertz, 3 gigahertz and 30 gigahertz, frequencies within the L-band, S-band, C-band, Ka-band, Ku-band, and/or frequencies within the X-band. Frequencies may be selected for penetrating foliage, water, ground, buildings, and/or other obstacles. The antenna system may include a plurality of different antennas, including at least one narrowband antenna, one broadband antenna, and at least one multi-band antenna.

According to various embodiments, one or more of the plurality of antenna assemblies may be permanently, semi-permanently, or removably secured to the tension member. In some embodiments, the plurality of antenna assemblies may be spaced along the length of a tension member as it is towed by an aerial platform, such that each of the plurality of antenna assemblies is at a different elevation with respect to the others. In some embodiments, one or more antenna assemblies may be secured to the tension member via a fixation device configured to control the orientation of an antenna relative to the tension member In some embodiments, the fixation device may be passive, such that an airstream may drive the antenna and/or the entire antenna assembly to an orientation with respect to the tension member. In other embodiments, the fixation device may be actively controlled, such as via an actuator connected to a power source, to adjust the orientation of an antenna relative to the tension member.

In some embodiments, the orientation of one or more of the antennas may be dynamically adjusted while being towed by an aerial platform and/or while in orbit secured to an orbiting satellite. The orientation of one or more antennas may be dynamically adjusted relative to the tension member, a target surface, a received RF signal, and/or gravity and/or based on other RF characteristics.

In various embodiments, an antenna system as described herein may be adapted for use with SAR. An antenna system may comprise a plurality of sub-receiving systems, each configured to receive a signal from one or more of the antennas in the antenna system. The sub-receiving systems and/or the receiving system may be located on the aerial platform (or satellite) or on the tension member. In some embodiments, the receiving system may record the information received from each of the plurality of antennas and associate it with an elevation and/or displacement of the antenna at the time the information was received. Accordingly, information from multiple elevations may be collected using the known time, elevation, and/or displacement of the information when it was collected by each antenna.

Three-dimensional (3D) SAR processing may then be used to create a 3D mapping or image of a target surface. In an embodiment where the tension member hangs straight down, such as a tension member secured to an orbiting satellite, each antenna may collect data at a different elevation, but at the same relative location to a target surface at any given time. In contrast, a tension member towed by an aerial platform may curve or otherwise be displaced from a straight-down configuration due to air resistance. By determining the relative location of each of the plurality of antennas, including elevation and any left, right, forward, and/or aft displacement, a pre-processor may adjust the information received by each of the plurality of antennas to compensate for the curvature and/or displacement of the tension member.

In some embodiments, processors, pre-processors, SAR devices, and/or other components may be part of the antenna system and/or located on the aerial platform. In other embodiments, a receiving system may simply record the information collected by each of the plurality of antennas, the associated location of each of the antennas, and/or time stamps for the collected information. In such an embodiment, the recorded data may be provided or transmitted to remote processing devices.

Any of a wide variety of SAR processing and/or associated data acquisition techniques may be utilized in conjunction with the presently described antenna systems and methods. Examples of SAR processing are described in U.S. patent application Ser. No. 08/657,602 filed May 31, 1996, now issued as U.S. Pat. No. 5,659,318, which application is hereby incorporated by reference in its entirety.

As previously described, the data collected from each of the plurality of antennas at varying elevations during a single pass may be adjusted to compensate for any curvature or displacement of the tension member, such that the collected data corresponds to data that would be collected by a single antenna during multiple passes of an aerial platform. Accordingly, any of a wide variety of 3D synthetic aperture radar imaging processing techniques, including those adapted for multiple passes of an aerial platform, may be used in combination with the presently described antenna systems and methods. An example of such a method is described in She, Z., Gray, D. A., Bogner, R. E., Homer, J., & Longstaff, I. D. (2002) '*Three-dimensional space-borne synthetic aperture radar (SAR) imaging with multiple pass processing*,' International Journal Remote Sensing, 23(20), 4357-82, which is hereby incorporated by reference in its entirety.

As used herein, an aerial platform may include any of a wide variety of moving platforms or vehicles. An aerial platform may include any moving platform, such as airborne and suspended platforms. For example, an aerial platform would include various aircraft and aerial vehicles. Aerial vehicles include, but are not limited to, airplanes, jets, helicopters, lighter-than-air-vehicles, unmanned aerial vehicles (UAVs), rocket-propelled aerial vehicles, and/or other similar vehicles. An aerial platform may also include any suitable structure extending from a moving and/or pivotable base. For example, a crane or mast mounted on a truck, ship, or other moveable and/or pivotable base, may suspend and/or otherwise support an antenna system as described herein. It will be appreciated that an orbiting satellite may be substituted for an aerial platform in many, if not all, of the embodiments described herein.

Some of the infrastructure that can be used with embodiments disclosed herein is already available, such as general-purpose computers, computer programming tools and techniques, digital storage media, and communication links. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 illustrates an antenna system, including a tension member 150 secured to an aerial platform 100. A plurality of antenna assemblies 151, 152, 153, and 154 are secured to and spaced along the tension member 150. Each antenna assembly may include at least one antenna for receiving and/or transmitting electromagnetic energy. In various embodiments, the antenna system may include a transmitter 110 configured to transmit an RF signal toward a target area on a surface 195. In various embodiments, the RF signal may be reflected by the surface 195 and/or other objects, such as a structure 190, and received by one or more of the antenna assemblies 151-154.

As illustrated, a first end of the tension member 150 may be secured to the aerial platform 100, such that the tension member 150 is configured to be towed by the aerial platform 100. The second end of the tension member 150 may be unsecured to the aerial platform, as illustrated. As the aerial platform 100 moves forward, air friction may displace the second end of the tension member 150 and/or cause the tension member 150 to curve slightly, as illustrated.

Throughout the drawings, the proportions and relative sizes of objects, features, and components may not be drawn to scale. For example, each antenna assembly 151-154 may be relatively small compared to the aerial platform 100 and/or the total length of the tension member 150. In some embodiments an antenna assembly 151-154 may include an antenna with a length between a quarter of a wavelength and a wavelength of a selected frequency, and the tension member 150 may have a length between ¼ and 2000 wavelengths of the selected frequency. In various embodiments, one or more of the antenna assemblies 151-154 may be configured for use with frequencies useful for radio communications, radiolocation, and/or radar. For example, the system may be useful for one or more types of synthetic aperture radar. As each of the antenna assemblies 151-154 is located at a different elevation, the antenna system depicted in FIG. 1 may be used to collect SAR data from multiple elevations using a single pass of the aerial platform 100 over a target area of the surface 195. Alternatively, multiple passes of the aerial platform 100, each at different elevations, may result in an even greater number of SAR data points at numerous elevations.

In some embodiments, each of the antenna assemblies 151-154 may be configured to receive (and/or transmit) an RF signal reflected by the surface 195 and/or the structure 190 and convey the collected information to a receiving system. The receiving system may be part of the antenna system and secured to the tension member 150, or alternatively located within the aerial platform 100. In various embodiments, a communication link may relay information from each of the plurality of antennas to the receiving system. In some embodiments, the receiving system may simply store the received information. In other embodiments, the receiving system may relay the information to a remote location and/or be used to transfer the information to a remote processing unit.

A SAR processor, such as a 3D SAR processor, may utilize the information collected from multiple elevations to generate a mapping, an image, and/or a rendering of the surface 195 and/or the structure 190. By collecting data from multiple elevations using a single pass of the aerial platform 100, a 3D mapping, image, and/or rendering of the structure 190 may be possible without the necessity of multiple passes. Moreover, using a single pass of an aerial platform 100 while collecting data from multiple elevations reduces the likelihood that objects on the surface 195 will move before subsequent passes can be performed, as is likely in systems configured for multi-pass elevational SAR data collection.

Each of the plurality of antenna assemblies 151-154 may be adapted for use (receiving and/or transmitting) with particular frequencies or frequency bandwidths. For example, the antenna assemblies 151-154 may be configured to transmit and/or receive a range of frequencies between approximately 10 kilohertz and 300 gigahertz. For example, an antenna system may be configured with one or more antenna assemblies 151-154 configured to receive and/or transmit frequencies between 3 megahertz and 30 megahertz, 30 megahertz and 300 megahertz, 300 megahertz and 3 gigahertz, 3 gigahertz and 30 gigahertz, frequencies within the L-band, S-band, C-band, Ka-band, Ku-band, and/or frequencies within the X-band. Frequencies may be selected for penetrating foliage, water, ground, buildings, and/or other obstacles.

Figure 2:
FIG. 2 illustrates an exemplary embodiment of a tension member comprising multiple strands, one or more of which may be used by a communication system.

FIG. 2 illustrates an exemplary embodiment of a tension member 250 comprising multiple strands 210 and 220. According to various embodiments, the tension member 250 may be constructed of any of a wide variety of materials or combination of materials capable of providing sufficient support for the plurality of antenna assemblies and the overall length of the tension member itself. Such materials include, but are not limited to, carbon fibers, glass fibers, nylons, metals, polypropylene, polyester, polyethylene, aramids, acrylics, and plastics. The tension member 250 may include a conductive material 210 and/or a dielectric material 220.

In some embodiments, the tension member may comprise a conductive member divided by a plurality of insulating members spaced along the length of the tension member, such that the tension member is divided into a plurality of segments of electrically conductive material separated from one another via an insulating member. Each of the plurality of segments may be non-resonant to relevant frequencies.

As illustrated, the tension member 250 may include a plurality of entwined strands 210 and 220. The entwined strands 210 and 220 may be braided, woven, twisted, and/or fused together. One or more of the strands may be integral to the communication system configured to connect one or more antennas (or antenna assemblies) secured to the tension member 250 to a receiving system on an aerial platform. For example, one or more of the conductive strands 210 may be configured to transmit electrical signals from secured antennas to a receiving system. Alternatively, the dielectric strands 220 may include an optical fiber configured to transmit information from secured antennas to a receiving system. One or more of the strands 210 and 220 may comprise a coaxial cable, a shielded cable, and/or another transmission medium suitable for data transmission.

Figure 3A:
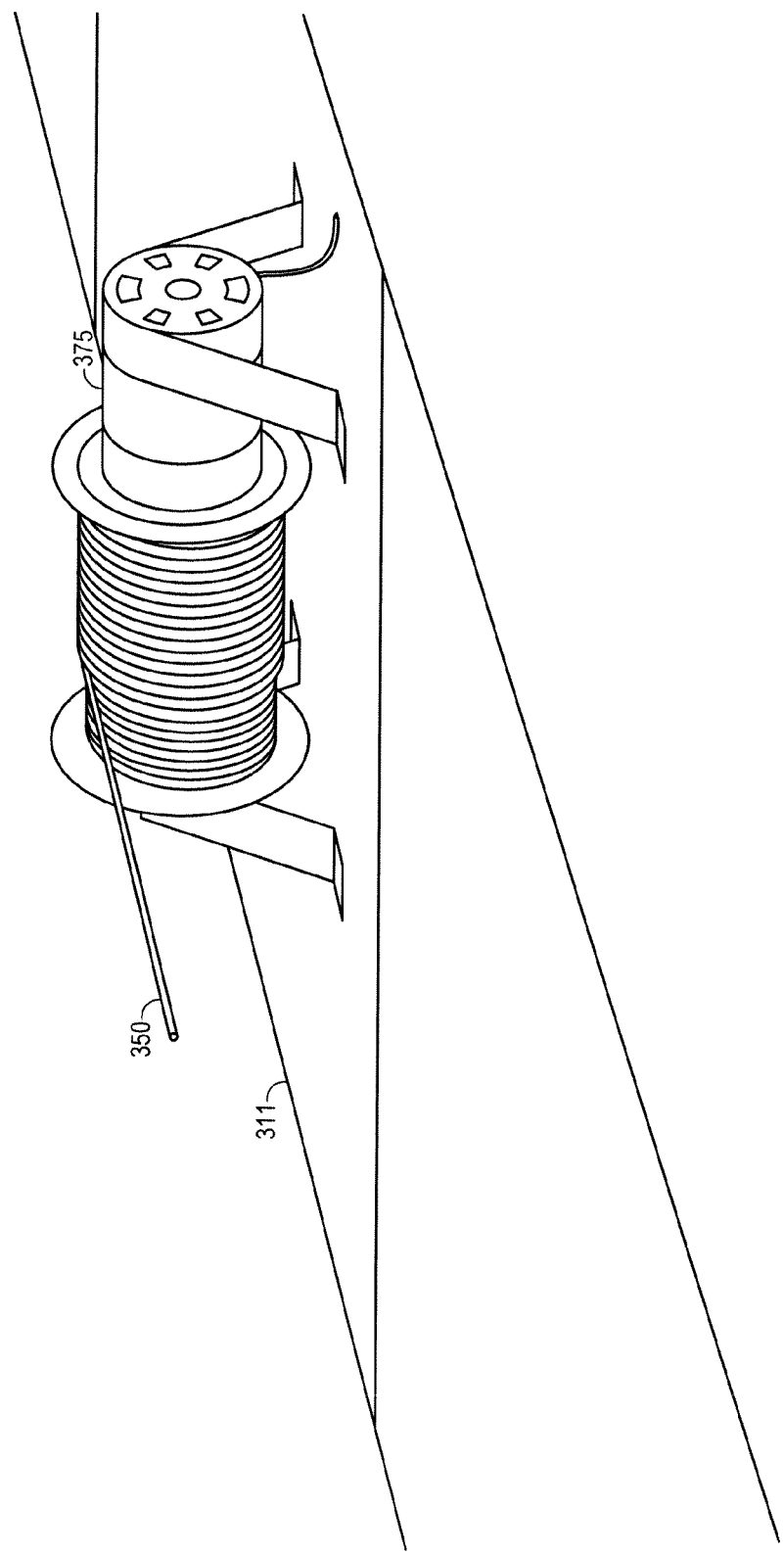
FIG. 3A illustrates a winch-style deployment mechanism adapted for in-motion deployment of a tension member.

FIG. 3A illustrates a winch-style deployment mechanism 375 for deploying a tension member 350 prior to an aerial platform 311 moving or while an aerial platform 311 is in motion. The illustrated embodiment includes the tension member 350 coiled around a drum of the deployment mechanism 375. As illustrated, the antenna assemblies have been removed from the tension member 350; however, in some embodiments, the antenna assemblies may remain secured to the tension member 350 in a storage (retracted) position while the tension member 350 is in a retracted position.

Figure 3B:
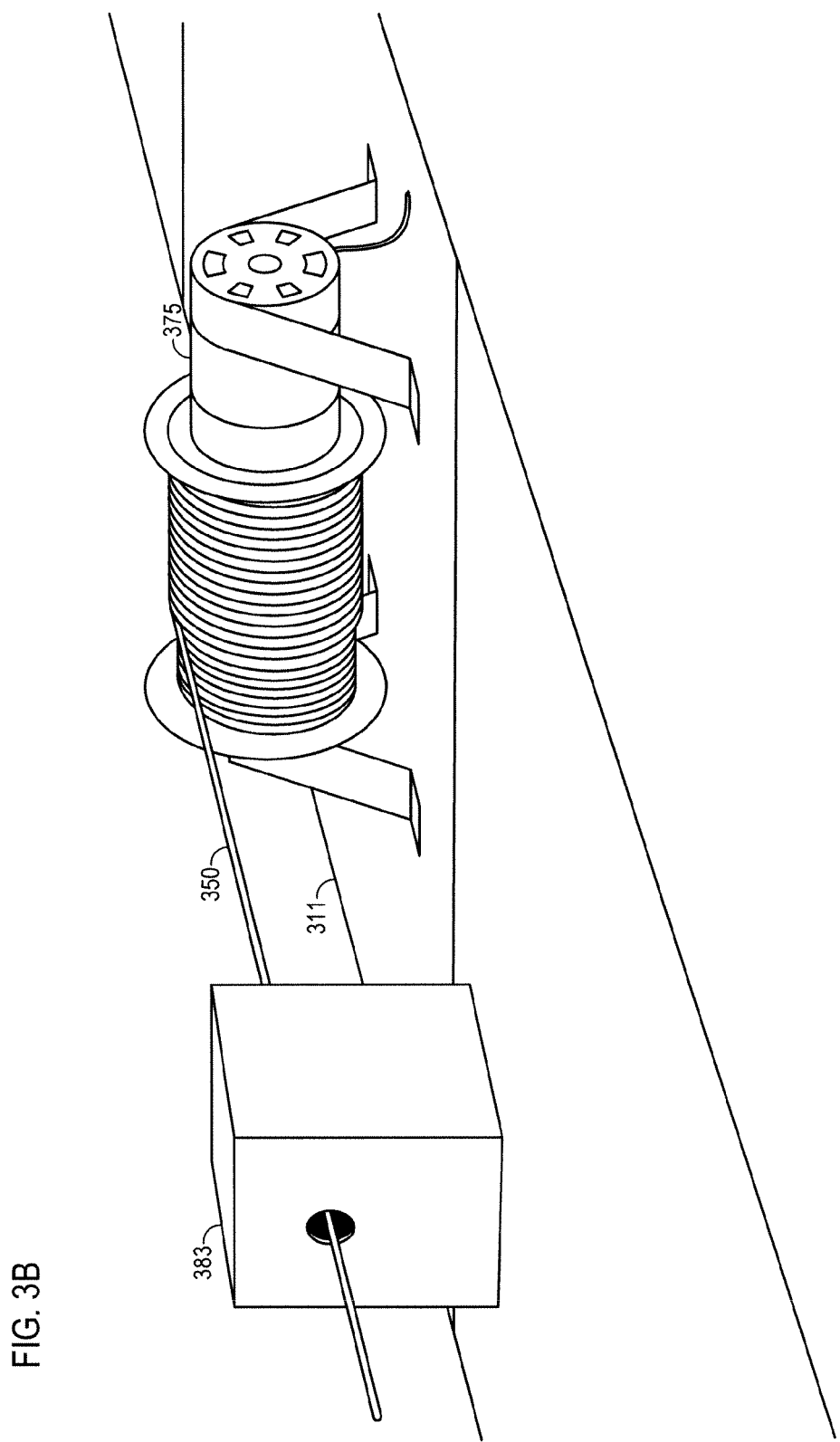
FIG. 3B illustrates the deployment mechanism with the tension member partially deployed.

FIG. 3B illustrates the tension member 350 partially deployed as it is unwound from the drum of the deployment mechanism 375 attached to the aerial platform 311. As illustrated, the tension member 350 may pass through an antenna assembly attachment device 383. The antenna assembly attachment device may be configured to selectively attach one or more types of antennas and/or antenna assemblies to the tension member 350 as it is deployed from the aerial platform 311.

Figure 3C:
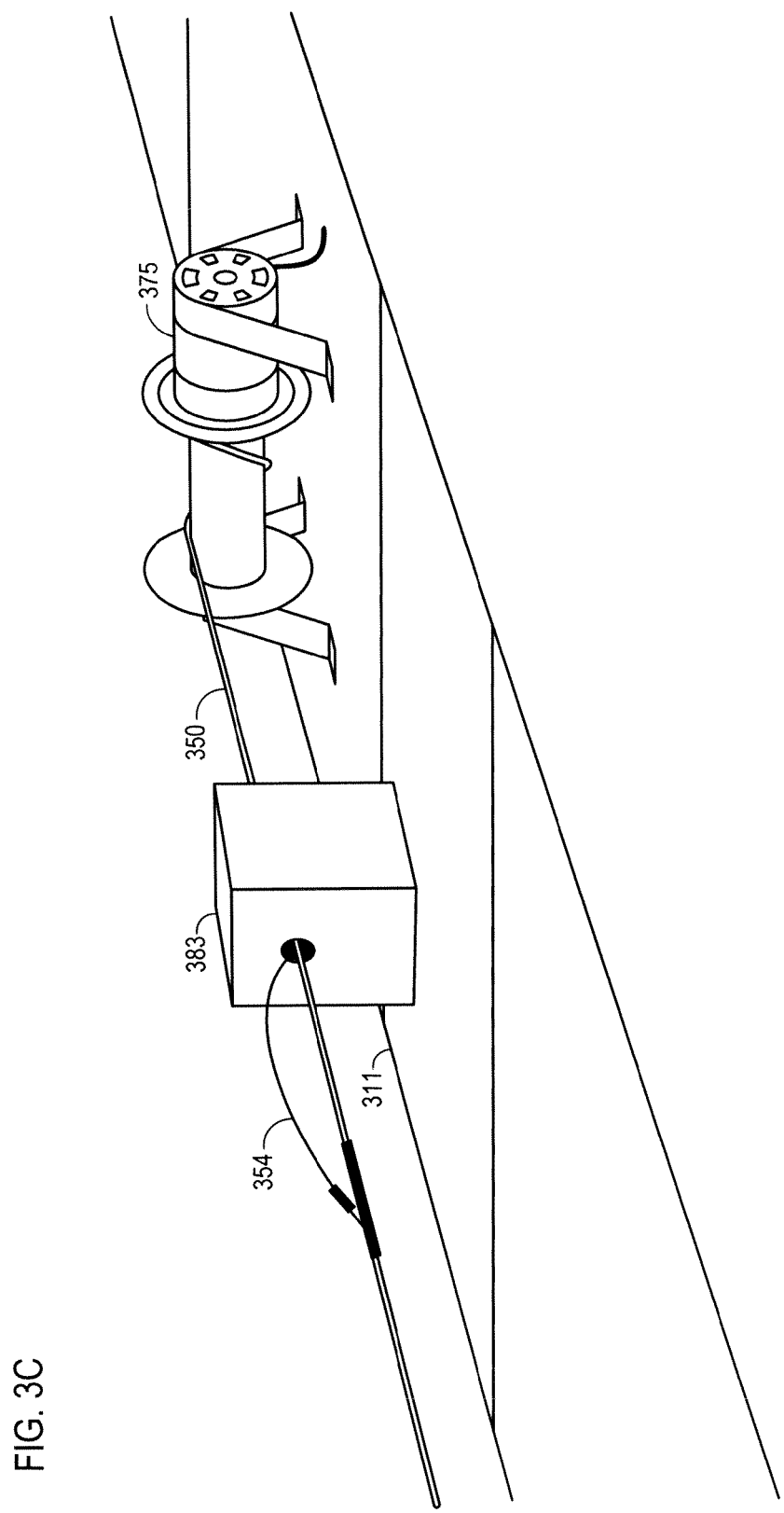
FIG. 3C illustrates an antenna assembly being selectively secured to the tension member as it is deployed from an aerial vehicle.

FIG. 3C illustrates an antenna assembly 354 being secured to the tension member by the antenna assembly attachment device 383 as the tension member 350 is deployed from the aerial vehicle 311 via the deployment mechanism 375. The antenna assemblies may be secured to and spaced apart from each other along the tension member 350 according to any of a wide variety of arrangements. The deployment mechanism 375 may be used to deploy the tension member 350 from any of a wide variety of aerial platforms, including, but not limited to, airplanes, jets, helicopters, lighter-than-air-vehicles, unmanned aerial platforms (UAPs), rocket-propelled vehicles, and/or other similar vehicles. As in other embodiments, the dimension and sizes of various components in the drawings may be exaggerated in order to show details of the presently described system and methods. For instance, the length of the tension member 350 may be significantly longer than suggested by the illustrations. According to various embodiments, antenna assemblies 354 may be secured to the tension member 350 while it is being deployed and/or after it has been fully deployed from the aerial vehicle 311. Similarly, one or more communication cables for connecting the antenna assemblies to a receiving system may be secured to, entwined with, and/or deployed along the length of the tension member during or following deployment.

The deployment mechanism 375 may be used to deploy the tension member 350 from any of a wide variety of aerial platforms and/or space craft, including, but not limited to, orbiting satellites, orbiting space craft, airplanes, jets, helicopters, lighter-than-air-vehicles, unmanned aerial platforms (UAPs), rocket-propelled vehicles, and/or other similar vehicles.

Figure 4:
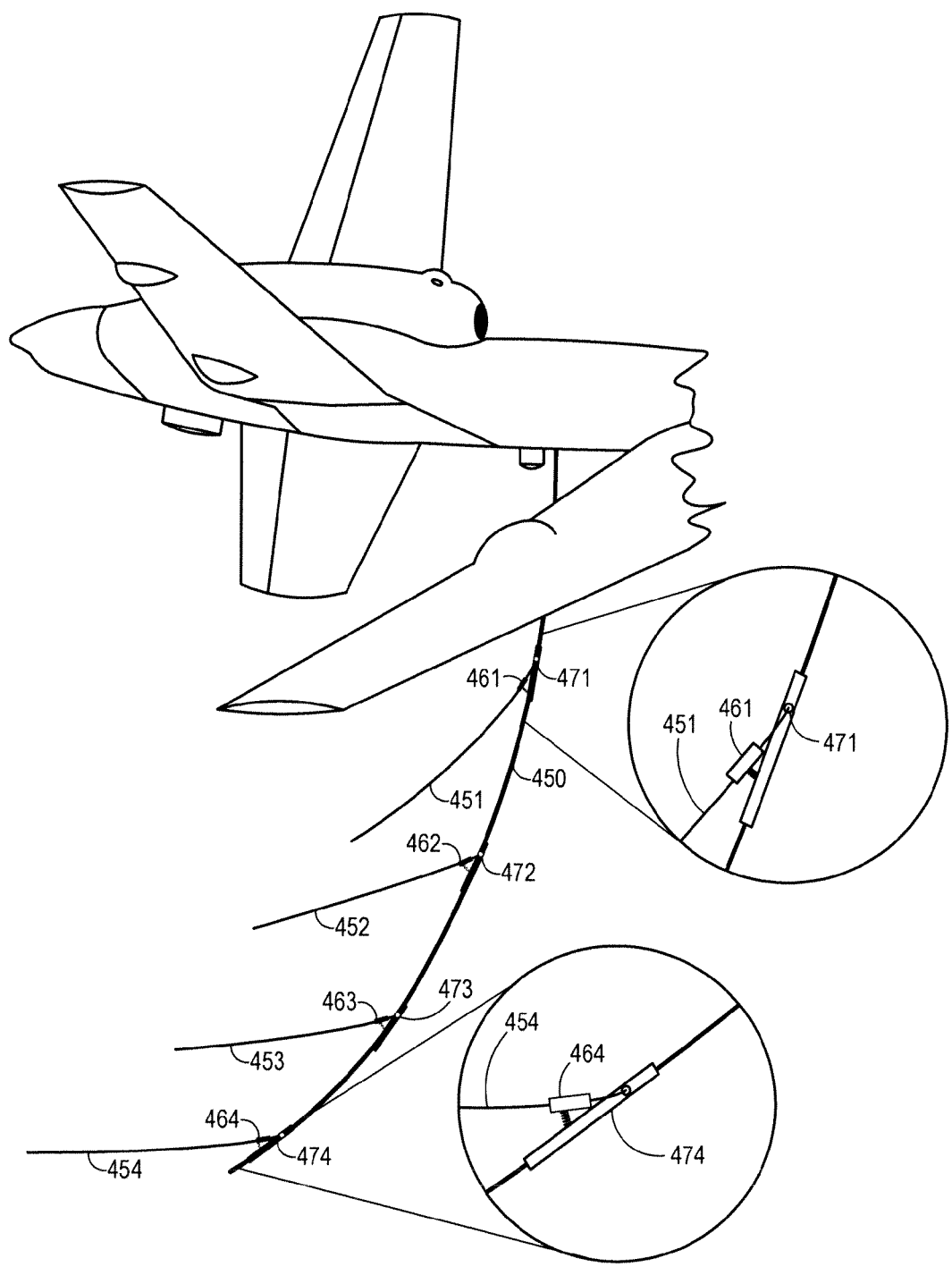
FIG. 4 illustrates a plurality of antenna assemblies, each secured to a tension member via a mechanism configured to deploy the antenna assemblies from a storage position to a deployed position.

FIG. 4 illustrates an antenna system configured with a plurality of antenna assemblies 451, 452, 453, and 455. Each of the antenna assemblies 451-454 may be secured to a tension member 450. As illustrated, at least some of the antenna assemblies 451-454 may be secured to the tension member 450 via a mechanism 461, 462, 463, and 464. The mechanisms 461-464 may be configured to pivot, or otherwise transition, each of the antenna assemblies 451-454 (or just the associated antennas) with respective to a pivot point 471, 472, 473, 474 and relative to the tension member 450. The mechanism 461-464 may allow the antenna assemblies 451-454 to be stored or retracted when the tension member 450 is retracted, rather than being removed. In some embodiments, the mechanisms 461-464 may comprise a spring, other resilient member, and/or a pneumatic device.

For example, as a winch-style deployment mechanism, such as those depicted in FIGS. 3A-3D, deploys the tension member 450, each of the antenna assemblies 451-454 may pivot about their respective pivot points 471-474 to transition from a storage position to a deployed position. Similarly, as the tension member 450 is retracted, each of the plurality of antenna assemblies 451-454 may retract and/or otherwise transition to a retracted position (i.e., storage position) with respect to the tension member 450.

Figure 5:
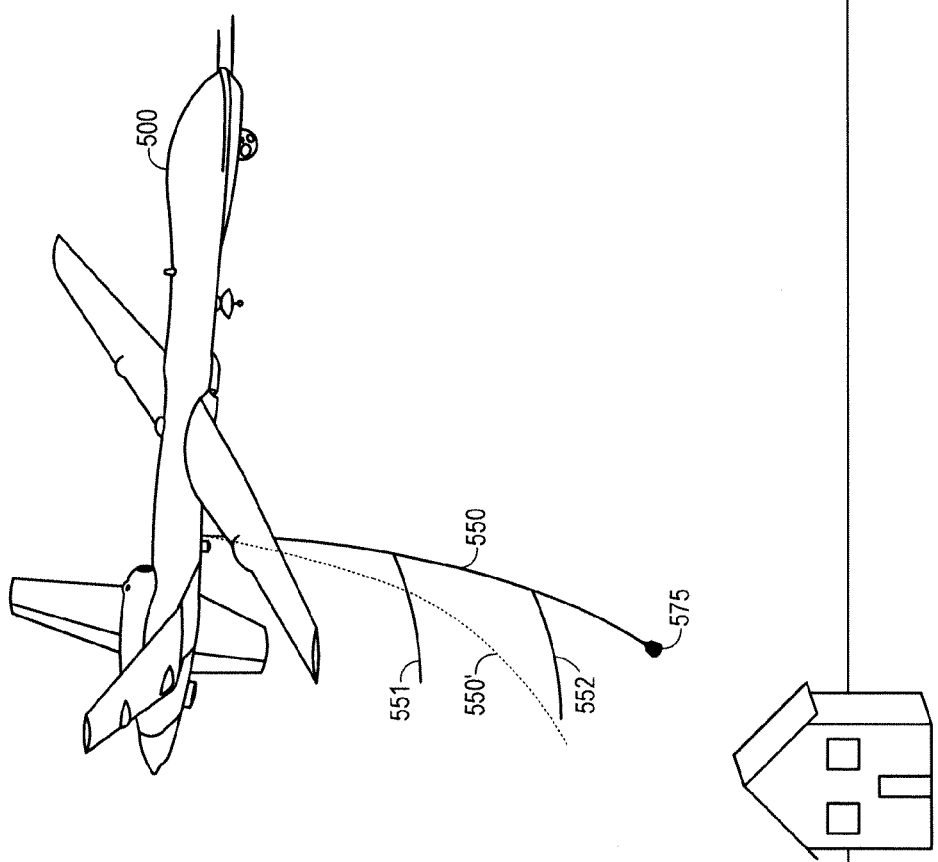
FIG. 5 illustrates a tension member configured with a non-antenna device for controlling the location of the second end of the tension member and/or the shape of the tension member.

FIG. 5 illustrates an antenna system towed by an aerial platform 500, including a tension member 550 configured with an end mass 575 adapted to control the location of the second end of the tension member 550 and/or shape the tension member 550. Any number of antennas and/or antenna assemblies may be secured along the length of the tension member 550, including antenna assemblies 551 and 552 as illustrated. The end mass 575 may provide a weight at the second end of the tension member 550 to cause the tension member 550 to hang more vertically and/or decrease the amount of curvature due to air friction as the aerial platform 500 travels. Dashed line 550' represents a possible curvature and location of the second end of the tension member 550 if end mass 575 were not present.

As previously described, the presently described systems and methods provide a means to collect information from multiple antennas at multiple elevations with a single pass of an aerial platform. In various embodiments, it may be useful or necessary to adjust the information received by each of the antennas based on displacement of the antenna in directions other than elevation due to air friction. The end mass 575 may cause the tension member 550 to hang more vertically from aerial platform 500, eliminating the need to adjust and/or reducing the degree to which the information is adjusted due to antenna displacement.

Figure 6:
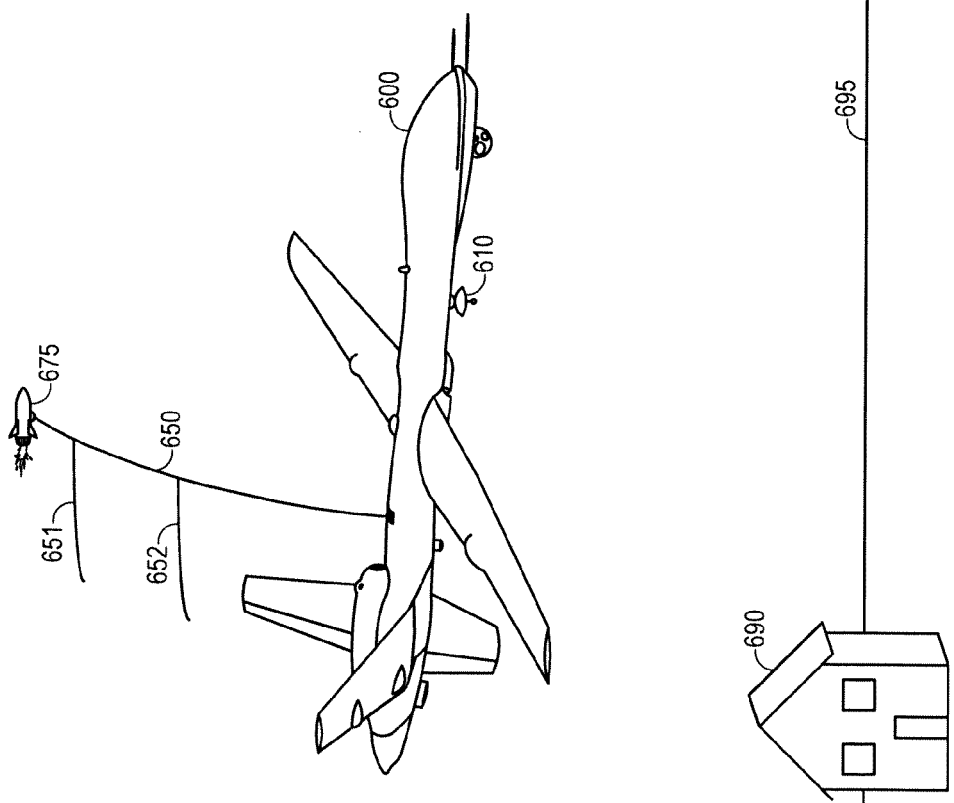
FIG. 6 illustrates a propulsion device secured to the second end of the tension member, the propulsion device configured to control the location of the second end of the tension member and/or shape of the tension member.

FIG. 6 illustrates a propulsion device 675 secured to the second end of a tension member 650. The propulsion device 675 may control the location of the second end of the tension member 650 and/or shape the tension member 650. Additional propulsion devices 675 may be located anywhere along the length of the tension member 650 to further shape the tension member 650. In the illustrated embodiment, the propulsion device 675 is configured to drive the second end of the tension member 650 above the aerial platform 600. Each of the antenna assemblies 651 and 652, and other additional antenna assemblies and/or antennas, may be secured along the length of the tension member 650 at varying elevations. Accordingly, each of the antenna assemblies 651 and 652 may receive an RF signal transmitted by transmitter 610 and reflected by a surface 695 and/or a structure 690 at a different elevation. Using the data collected at multiple elevations, 3D SAR, or other radio signal, processing may be performed using a single pass of an aerial platform.

Figure 7:
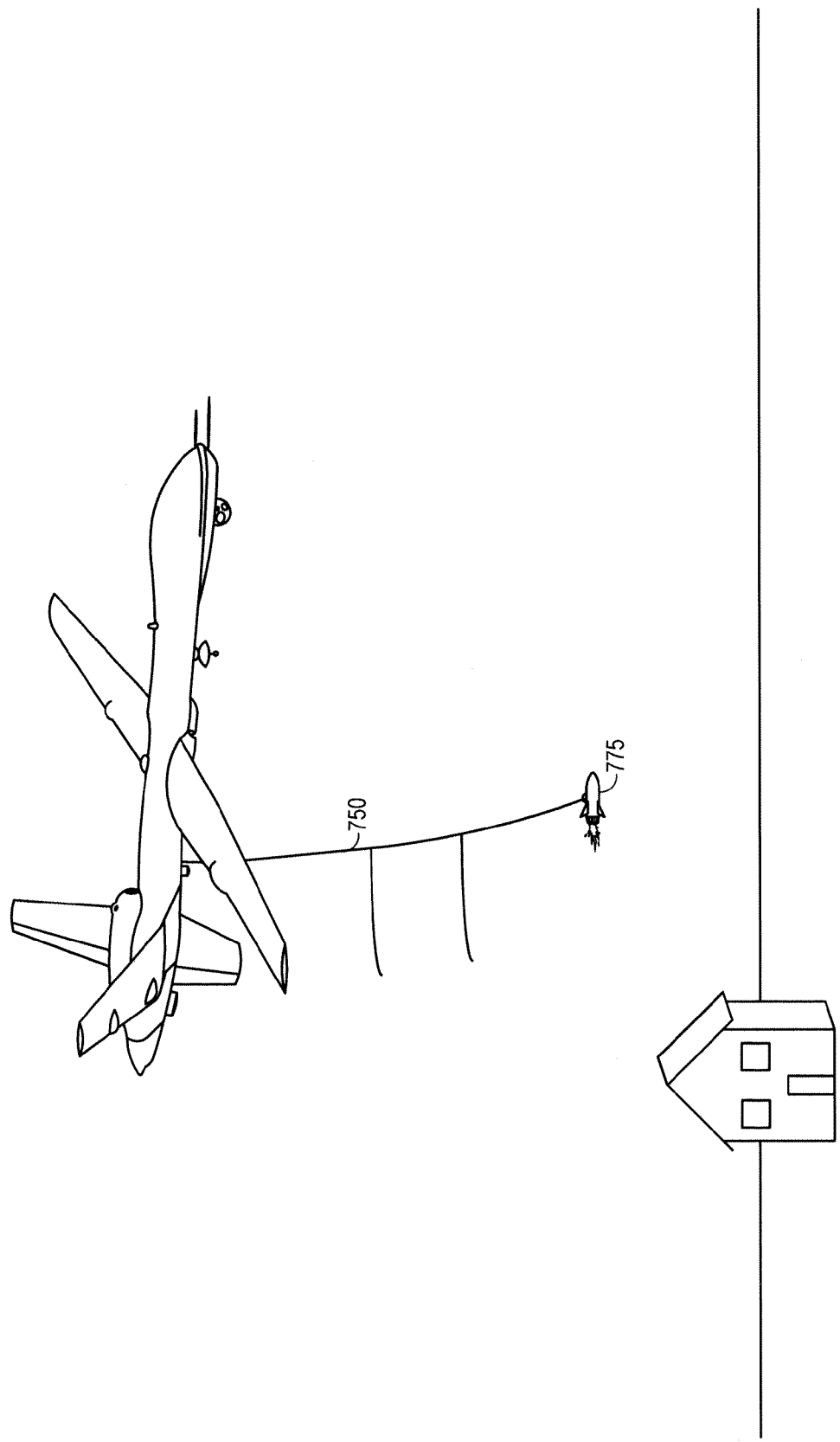
FIG. 7 illustrates another embodiment of a propulsion device secured to the second end of the tension member, the propulsion device configured to control the location of the second end of the tension member and/or shape of the tension member.

FIG. 7 illustrates another embodiment of a propulsion device 775, in which the propulsion device 775 is secured to the second end of the tension member 750 and configured to shape the tension member 750 more vertically downward. Again, the propulsion device 775 may be configured to control the location of the second end of the tension member 750 and/or shape the tension member 750.

Figure 8:
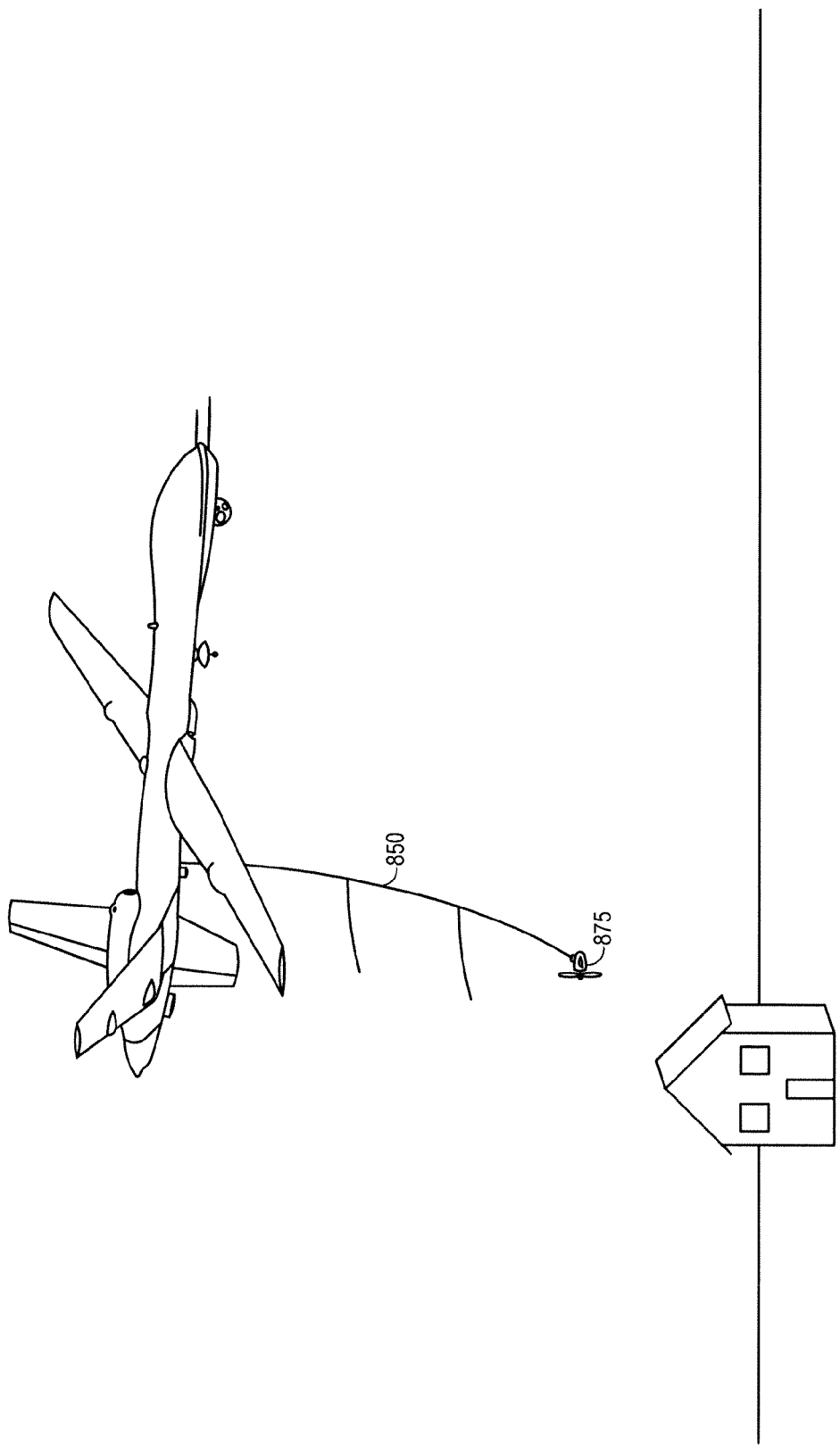
FIG. 8 illustrates an example of a propeller device secured to the second end of the tension member, the propeller device configured to control the location of the second end of the tension member and/or shape of the tension member.

FIG. 8 illustrates an example of a propeller device 875 secured to the second end of the tension member 850. The propeller device 875 may be configured to control the location of the second end of the tension member 850 and/or shape the tension member 850. Any of a wide variety of tension member shaping and/or tension member location control devices may be employed, including any combination of end masses, airfoils, wings, fins, flaps, drag cones, and/or propulsion systems. Such control devices may be positioned along the tension member 850 and/or secured to the second end thereof. The control devices may be passive, such as an end mass, and/or actively powered/controlled, such as a propulsion system. Some control devices, such as the propeller device 875, may be actively powered and/or passively driven by a passing airstream. Control devices, receiving systems, transmitters, communication systems, and/or other devices associated with an antenna system may be powered using a generator, a turbine, a battery, an optical cable, a free-space optical power system, a power cable extending along or entwined with the tension member, a solar panel, and/or another mobile power generating apparatus.

Figure 9:
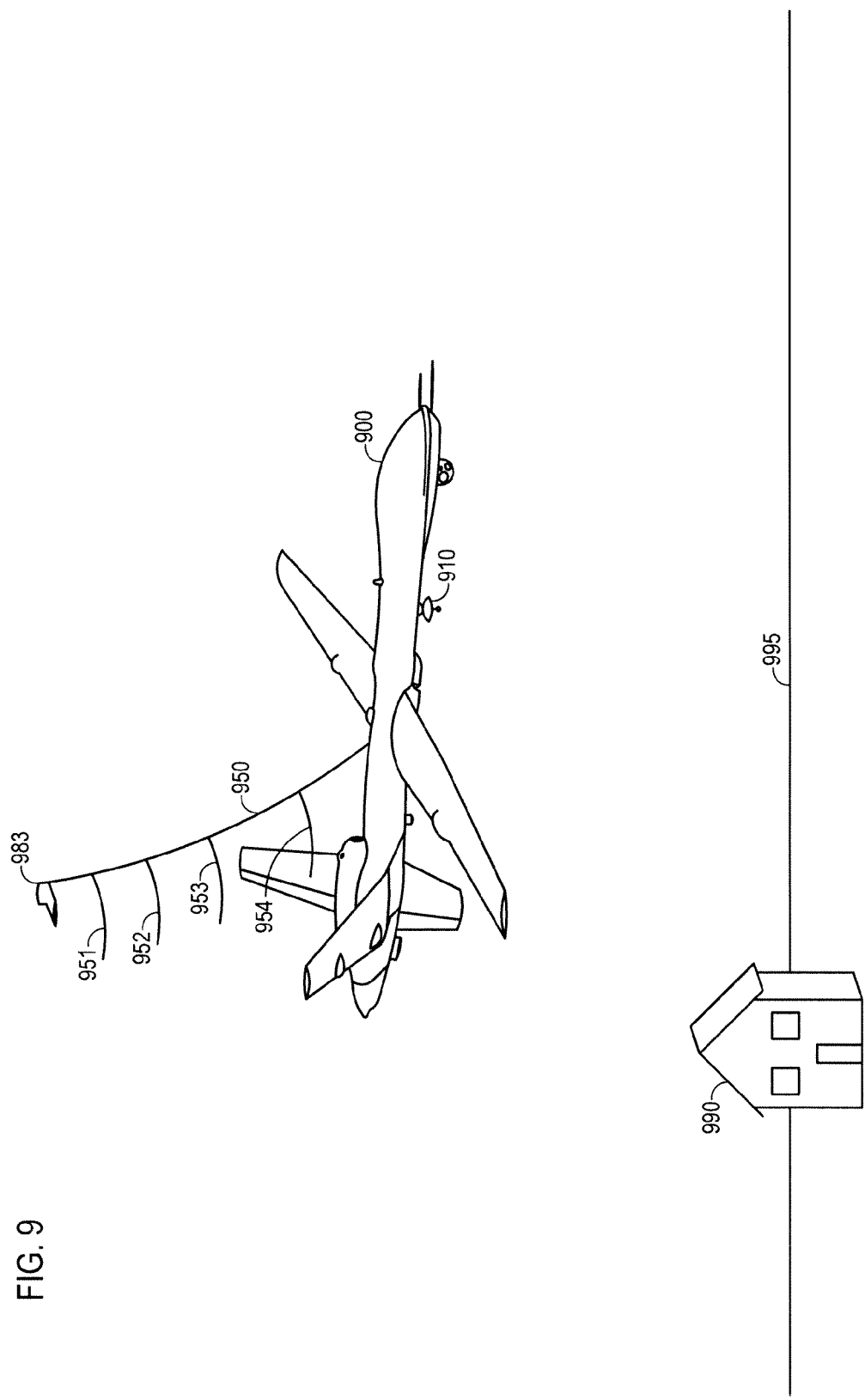
FIG. 9 illustrates an example of a tension member elevated by an airfoil.

FIG. 9 illustrates an example of an antenna system including a tension member 950 suspended by an airfoil 983 above the aerial platform 900. The airfoil 983 may control the location of the end of the tension member 950 and/or shape the tension member 950. Additional airfoils may be located anywhere along the length of the tension member 950 to further shape the tension member 950. In the illustrated embodiment, the airfoil 983 is configured to drive the second end of the tension member 950 above the aerial platform 900. Each of the antenna assemblies 951, 952, 953, and 954 and/or other additional antenna assemblies and/or antennas, may be secured along the length of the tension member 950 at varying elevations.

A receiving system may receive, store, and/or process the electromagnetic energy received by the antennas in the antenna assemblies 951-954. According to various embodiments, any of a wide variety of signal processing systems and/or methods may be utilized in conjunction with the presently described antenna systems, including, but not limited to, SAR and 3D SAR techniques. In various embodiments, the signals received by each of a plurality of antennas secured at various elevations along a towed tension member may be adjusted to compensate for curvature and/or any displacement of the tension member, such that the signals effectively represent data collected at the same co-planar location relative to a target surface, but at multiple elevations. Using the collected data, any of a wide variety of 3D SAR techniques, including those adapted for multiple passes of an aerial platform, may be used in combination with the presently described antenna systems and methods.

Figure 10:
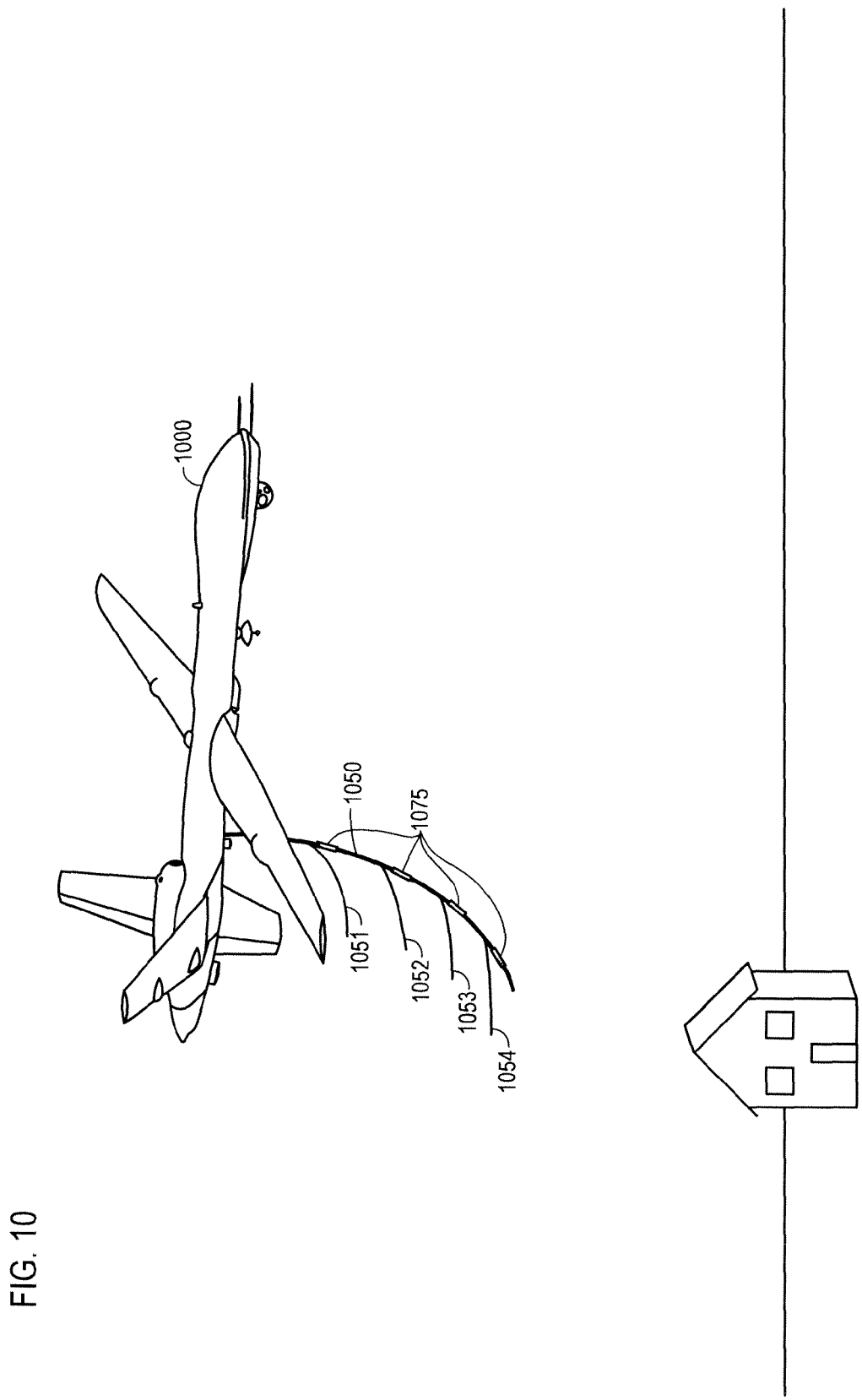
FIG. 10 illustrates a tension member comprising a plurality of oscillation dampening devices configured to dampen oscillations along the tension member.

FIG. 10 illustrates an antenna system, including a tension member 1050 towed by an aerial platform 1000. As illustrated, a plurality of antenna assemblies 1051, 1052, 1053, and 1054 may be secured to, spaced apart from each other, and extend from the tension member 1050. As previously described, the tension member 1050 may be between a few wavelengths and several thousand wavelengths long. That is, using a frequency between 3 megahertz and 3 gigahertz, the tension member 1050 may be up to tens or hundreds of meters long, or in some cases even several thousand meters long. Accordingly, one or more oscillation dampening devices 1075 may be secured along or in-line with the tension member 1050. Any of a wide variety of oscillation dampening devices may be utilized, as are commonly known in the art. In some embodiments, the oscillation dampening devices may comprise passive dampening devices. The oscillation dampening devices may also comprise actively controlled/powered dampening devices.

Figure 11:
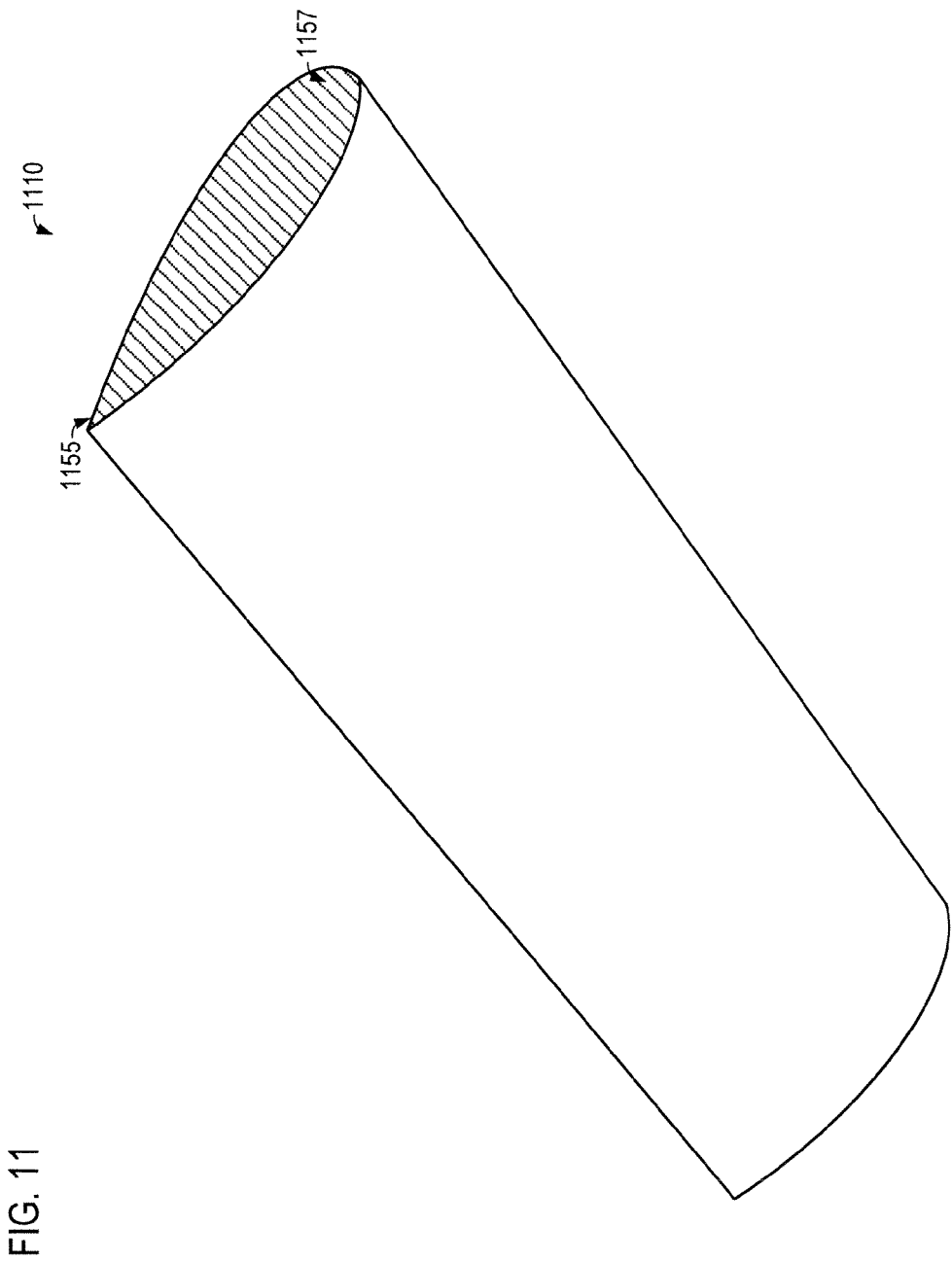
FIG. 11 illustrates an embodiment of a tension member configured with a non-circular cross section to reduce and/or eliminate twisting and/or drag.

FIG. 11 illustrates an embodiment of a section of a tension member 1110 configured with a rounded front 1157 and a tapered rear 1155. According to such an embodiment, a tension member 1110 configured with a rounded front 1157 and/or a tapered rear 1155 may reduce air friction and/or reduce or eliminate twisting of the tension member 1110 during use. Any of a wide variety of shapes, dimples, divots, grooves, fins, foils, and/or other aerodynamic characteristics may be used to reduce the aerodynamic drag of a tension member, antenna, communication system, receiving system, and/or transmitter. In some embodiments, it may be desirable to reduce air drag as much as possible in order for the tension member to hang as close as possible to straight down from an aerial platform and/or to minimize the propulsive power required by the platform.

Figure 12:
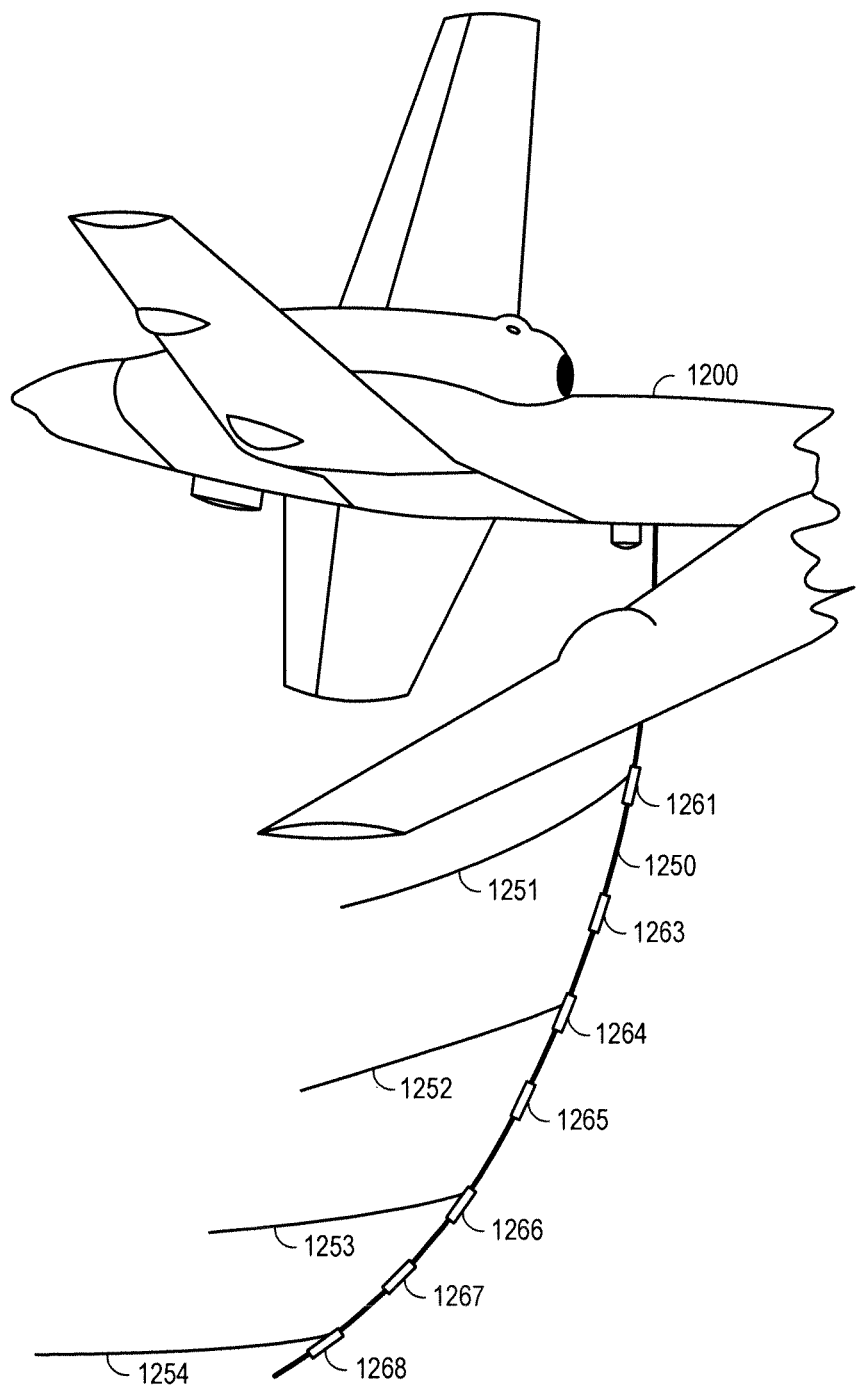
FIG. 12 illustrates an embodiment of a tension member with a plurality of curvature detectors spaced along its length.

FIG. 12 illustrates an embodiment of an antenna system towed by an aerial platform 1200, including a tension member 1250, a plurality of antenna assemblies 1251, 1252, 1253, and 1254 and an antenna location system. Accurate elevational data for each of the plurality of antennas associated with each of the antenna assemblies 1251-1254 may be useful for performing various calculations, including those associated with radio communication, radiolocation, and/or radar techniques, such as 3D SAR. In the illustrated embodiment, the antenna location system comprises a plurality of curvature detectors 1261, 1262, 1263, 1264, 1265, 1266, 1267, and 1268, spaced along the length of the tension member 1250. In various embodiments, the sensors 1261-1268 may be coincident with antenna assemblies 1251-1254 and some of the sensors 1261-1268 may be spaced between the antenna assemblies 1251-1254. One or more of the sensors may be configured to sense or determine a curvature, temperature, tension, strain, and/or another property of the tension member 1250.

According to various embodiments, each of the curvature detectors 1261-1268 may be configured to determine the amount of curvature of the tension member 1250 at a given point, or at all points. Using a known length of the tension member 1250, a known position of each of the plurality of antennas associated with each of the antenna assemblies 1251-1254, and the detected curvature, a relative elevation of each of the plurality of antenna assemblies 1251-1254 may be determined. The curvature detectors 1261-1264 may comprise a curvature sensing fiber optic sensor extending along at least a portion of the length of the tension member 1250.

Figure 13A:
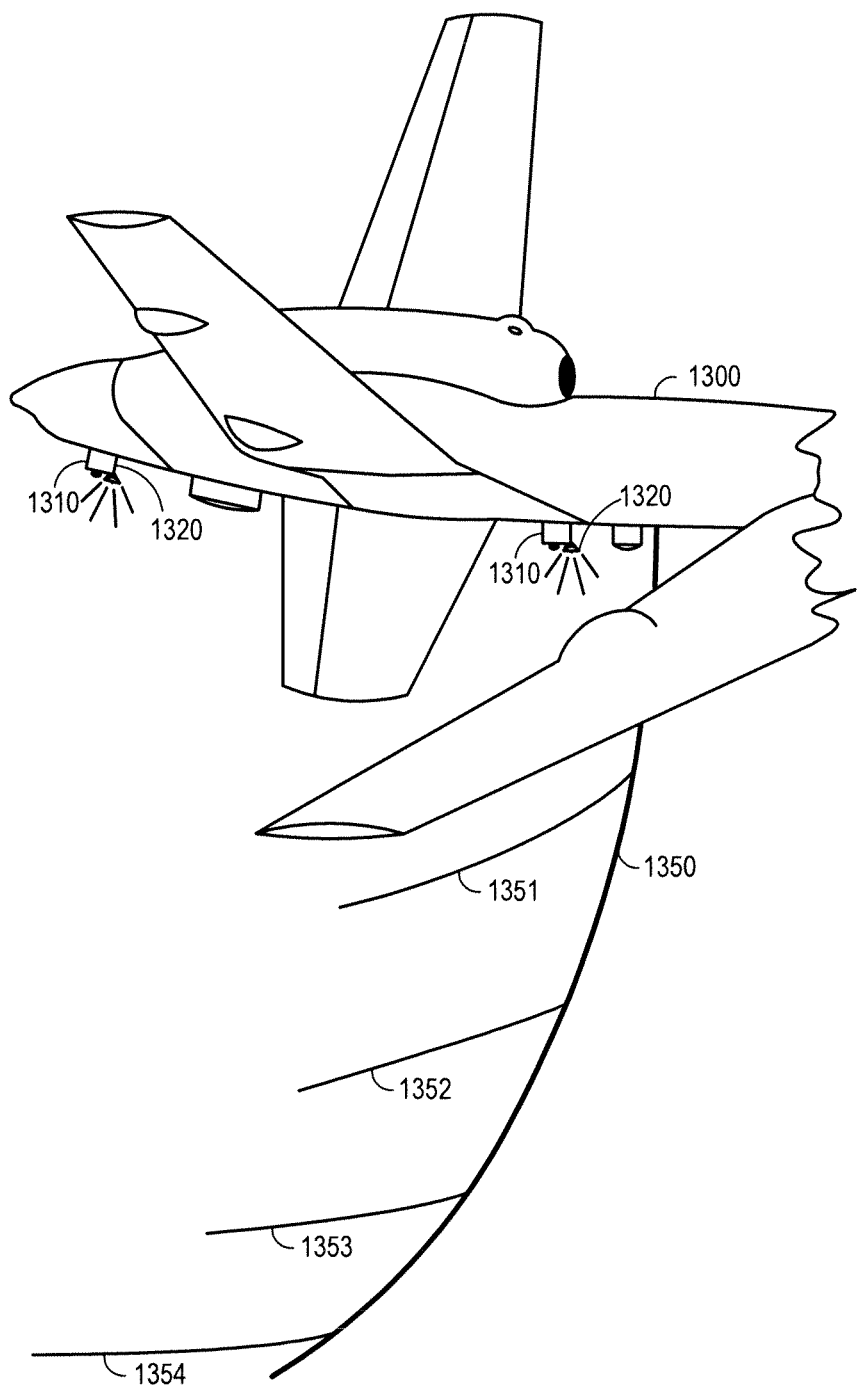
FIG. 13A illustrates an embodiment of a location system configured to determine a location of each of a plurality of antenna assemblies along the length of a tension member using an imaging device.

FIG. 13A illustrates another embodiment of an antenna system including a tension member 1350, a plurality of antenna assemblies 1351, 1352, 1353, and 1354, and an antenna location system. In the illustrated embodiment, an imaging device 1310 may optically determine the location of each of the antennas associated with each of the plurality of antenna assemblies 1351-1354. In some embodiments, the imaging device may include an artificial light source 1320, such as a flash, to enhance the image and allow for improved location determination of each of the antennas associated with each of the plurality of antenna assemblies 1351-1354. The imaging device 1310 and/or associated processing device may utilize any of a wide variety of imaging detection techniques, including auto-focusing techniques, such as contrast detection, phase detection focusing, and image analysis techniques such as object detection, edge detection, and/or other image analysis techniques, to determine a relative location of each of the plurality of antennas associated with each of the plurality of antenna assemblies 1351-1354. In some embodiments, the imaging device 1310 may determine a curvature of the tension member 1350 and then the antenna location system may calculate the location (displacement and/or elevation) of each of the plurality of antennas using that information.

Figure 13B:
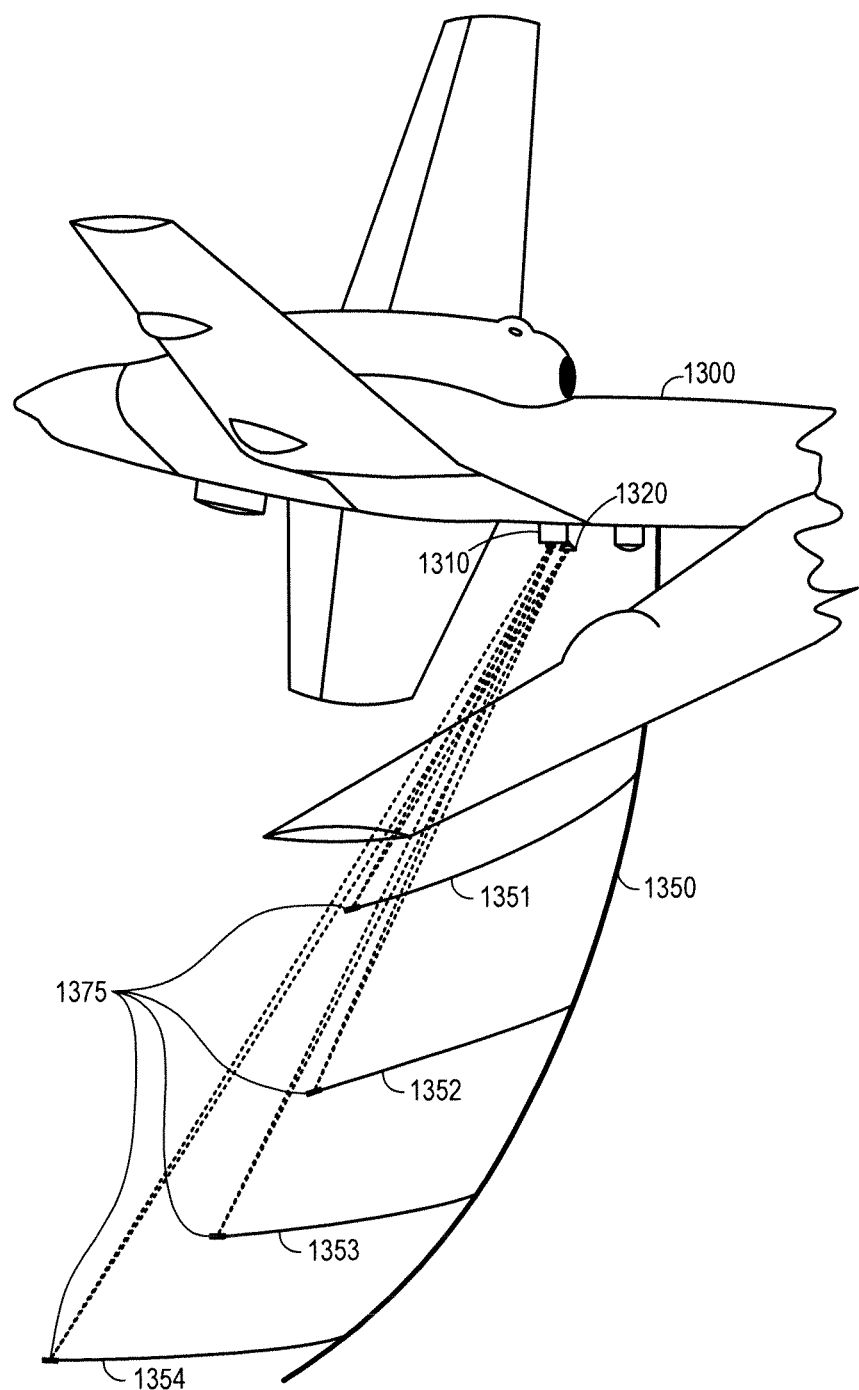
FIG. 13B illustrates the embodiment of FIG. 13A, where each of the plurality of antenna assemblies comprises a retroreflector.

FIG. 13B illustrates an embodiment similar to that of FIG. 13A, in which each of the plurality of antenna assemblies 1351-1354 includes a reflector or retroreflector 1375. The artificial light source 1320 may transmit light to each of the retroreflectors 1375. The light may return from the retroreflectors 1375 to the imaging device 1310 and facilitate in the determination of the location of each of the plurality of antennas. The concept of "determining the location" of an antenna or antenna assembly, as used herein, may relate to determining the physical location of some portion of an antenna or antenna assembly, such as a connection point, endpoint, midpoint, etc., and/or to a phase center of an antenna.

Figure 14:
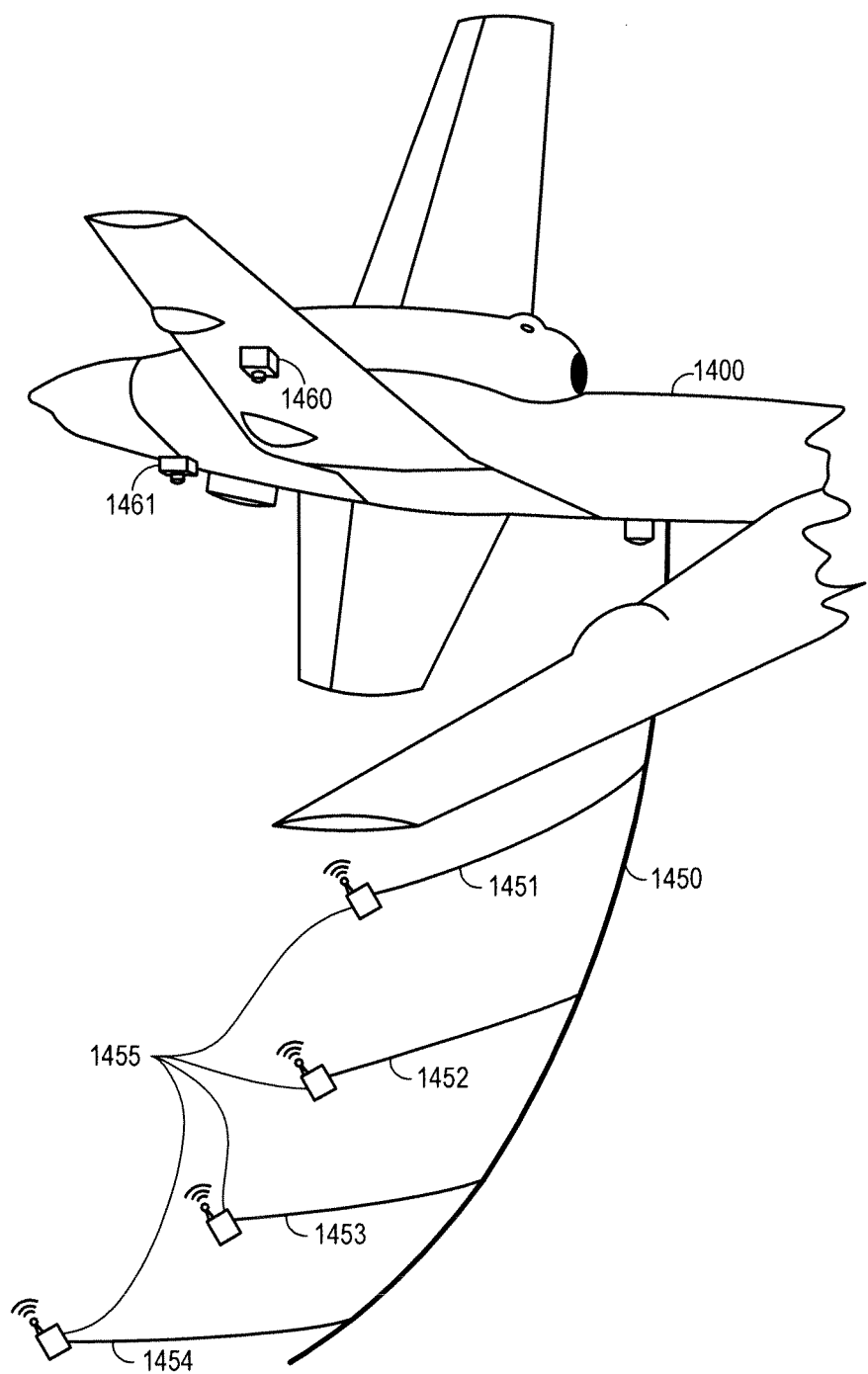
FIG. 14 illustrates an embodiment of a location system configured to determine the location of each of a plurality of antenna assemblies along the length of a tension member using a local positioning system (LPS) and/or global positioning system (GPS).

FIG. 14 illustrates another embodiment of an antenna system towed by an aerial platform 1400, including a tension member 1450, a plurality of antenna assemblies 1451, 1452, 1453, 1454, and 1455, and an antenna location system. In the illustrated embodiment, the antenna location system may include a processing device (not illustrated) that receives information (such as a time stamp) from a local positioning system (LPS) device or global positioning system (GPS) device 1453 secured adjacent to, near, or to each of the antennas 1451-1455. Using the received information, the antenna location system may determine the relative location of each of the plurality of antennas associated with each of the antenna assemblies 1451-1455. Receivers may be located in one or more locations to receive information from the LPS, such as receivers 1460 and/or 1461. Multiple receivers (e.g., 3 or more) may be used for accurate triangulation of a location. Transmitters (pseudolites) 1460, 1461 may be placed in two or more locations to supply signals for a local positioning system. Three or more transmitters may be used to allow full three-dimensional locating. Alternatively, in some embodiments, devices 1455 may be transmitters of the LPS signal, while devices 1460, 1461 may be LPS receivers.

Figure 15:
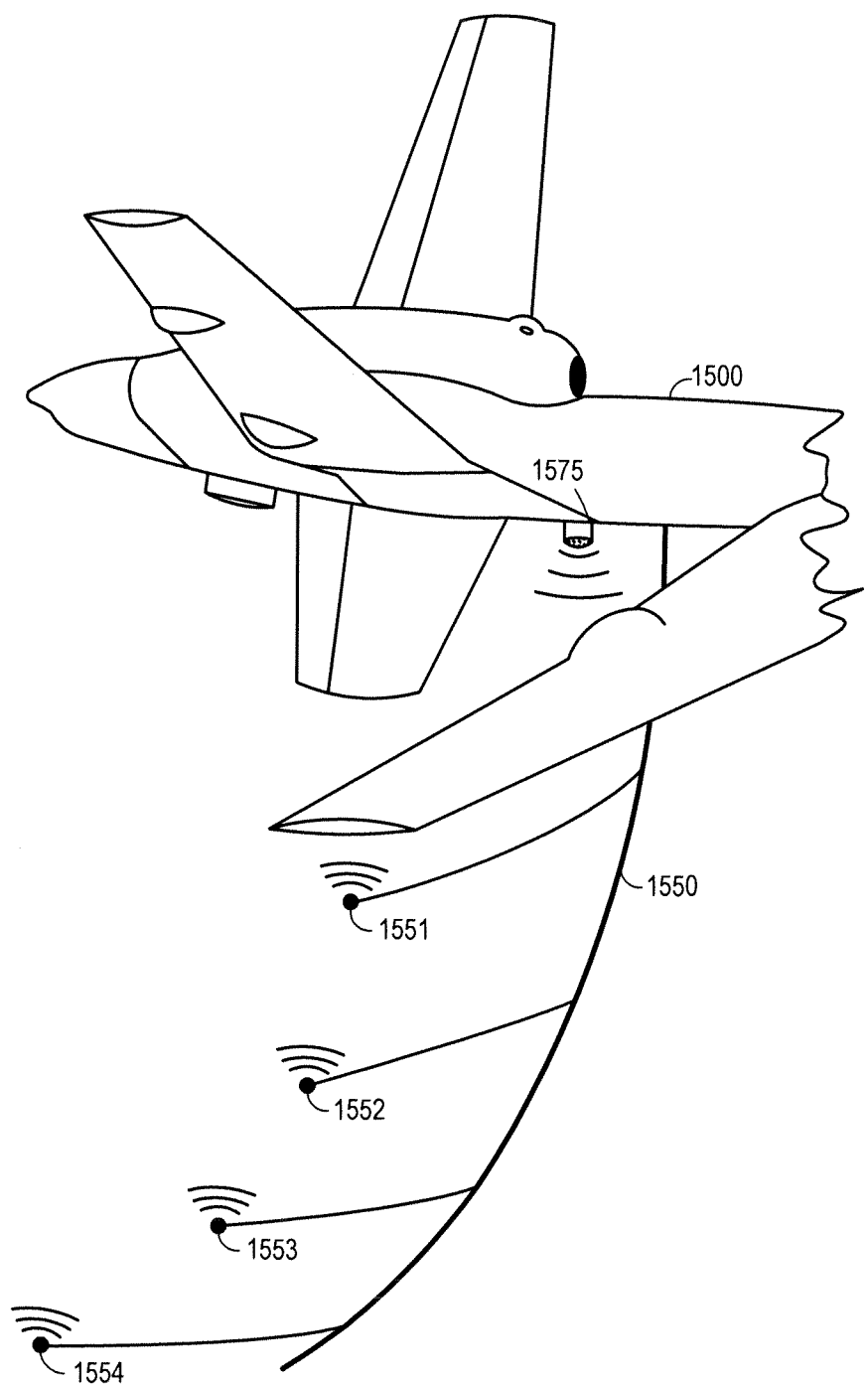
FIG. 15 illustrates an embodiment of a location system comprising a sonar system configured to determine the location of each of a plurality of antenna assemblies along the length of a tension member using reflected radio signals.

FIG. 15 illustrates another embodiment of an antenna system towed by an aerial platform 1500, including a tension member 1550, a plurality of antenna assemblies 1551, 1552, 1553, 1554, and 1555, and an antenna location system. In the illustrated embodiment, the antenna location system may utilize an RF transceiver to emit a radio signal (out-of-band relative to the antennas tuning) that is reflected by the antennas 1551-1555. By measuring the timing, incident direction, and/or phase of the returning RF signals, the location of each of the antennas of each of the antenna assemblies 1551-1555 may be determined. Antennas 1551-1554 may incorporate RF retroreflectors or transponders to increase the returned signal and to provide a known location for the point of reflection. Alternatively, in some embodiments, acoustic (audible or ultrasonic) signals may be used in place of RF signals. In some embodiments, the acoustic signals may be corrected for Doppler shift due to the motion of the platform through the air.

FIGS. 12-15 illustrate various examples of antenna location systems. Any of a wide variety of antenna location systems and methods may be used in combination or alone, including those utilizing a measured or determined tension of a tension member, a tensile modulus of the tension member, a coefficient of expansion, a temperature of the tension member, an imaging device, artificial light, a reflector, a retroreflector, a global positioning system (GPS), a local positioning system (LPS), interferometry of a radio frequency (RF) signal, an optical signal, laser scanning system, inertial sensors, and/or another sensor device to determine the relative and/or absolute location of each of a plurality of antennas (and/or antenna assemblies) along a tension member. In some embodiments, the location of some of the plurality of antennas may be determined and the location of the other antennas may be estimated based on the known location of an end of the tension member, a known length of a tension member, and/or the location and/or spacing of some of the plurality of antennas.

Figure 16:
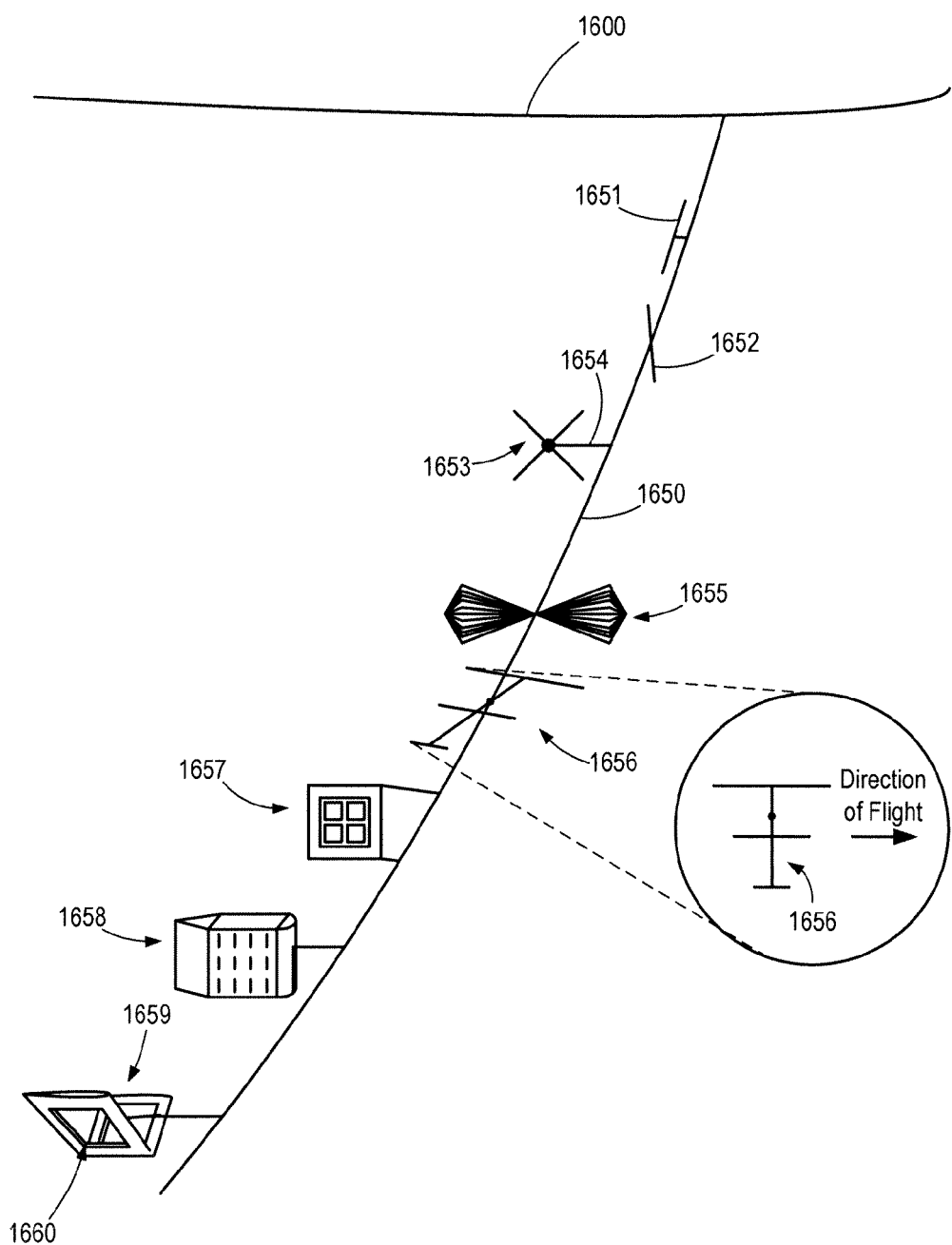
FIG. 16 illustrates various possible antenna types that may be secured to a tension member.

FIG. 16 illustrates a variety of possible antenna types attached to a tension member 1650, which is deployed from a platform 1600. An antenna 1651 is a dipole antenna parallel to the tension member 1650, which might be physically integrated into or onto the tension member, e.g., by taping, gluing, etc. the antenna conductors to the tension member. The antenna 1652 is a vertically-oriented dipole antenna mounted directly to the tension member 1650. An antenna 1653 is a pair of crossed dipoles, suitable for transmitting or receiving any polarization (e.g., horizontal, vertical, diagonal, circular) attached to the tension member 1650 by a feed element 1654. The antenna 1655 is a wire bicone antenna, similar to dipole 1652 but having broader bandwidth. The antenna 1656 is a Yagi (or Yagi-Uda) multi-element antenna, oriented cross-track. Unlike the antennas listed above, this antenna will preferentially receive signals from one side of the platform's track. The antenna 1657 is a thin flat panel antenna, such as a patch radiator antenna, mounted on a rigid panel. The antenna 1658 is a thick flat panel antenna, such as an active phased array antenna, mounted in an airfoil-shaped housing for reduced aerodynamic drag. Finally, the antenna 1659 is an example of an antenna assembly comprising a flat panel antenna 1660, such as a steerable metamaterial antenna, supported at an angle to vertical. Such antenna configurations are commonly used for radars intended to view the ground close to the ground track of the aerial platform.

Figure 17:
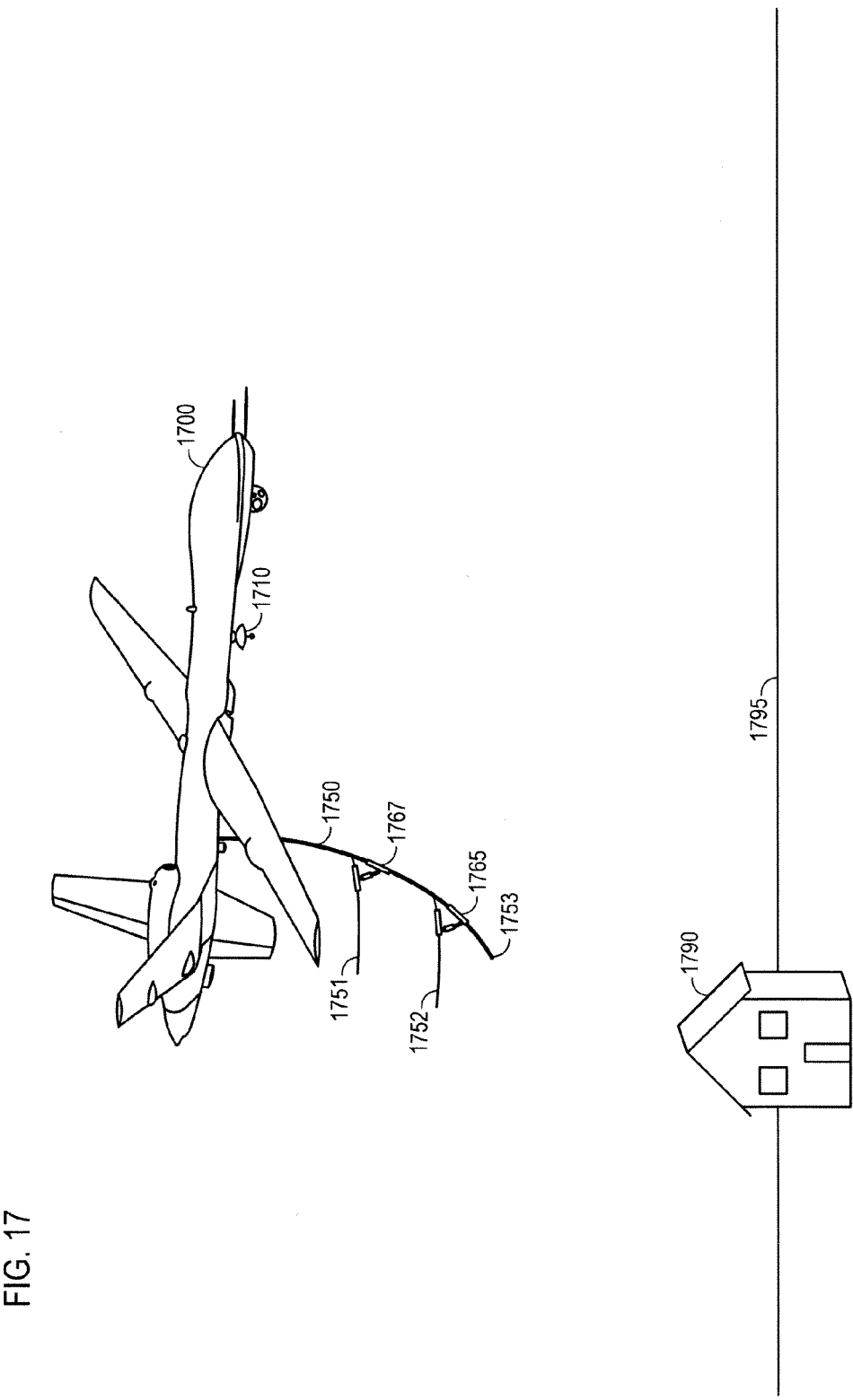
FIG. 17 illustrates an embodiment of a plurality of antenna assemblies each secured to a tension member via an orientation adjustment mechanism.

FIG. 17 illustrates an embodiment of a plurality of antenna assemblies 1751, 1752, and 1753 each secured to a tension member 1750. The antenna assemblies 1751 and 1752 may be secured to the tension member via the orientation adjustment mechanisms 1765 and 1767. As the tension member 1750 is towed by an aerial platform 1700, the orientation of the antenna assemblies and/or associated antennas 1751 and 1752 may be adjusted relative to the tension member 1750, a surface 1795, and/or the aerial platform 1700. In some embodiments, an RF signal transmitted by a transmitter 1710 may be reflected by a structure 1790 and then received by the antenna assemblies 1751-1753. The orientations of the antenna assemblies 1751 and 1752 may be dynamically adjusted via the orientation adjustment mechanisms 1765 and 1767 to optimize the reception of the desired/selected reflected signal(s).

The orientation, angle, or other antenna property, such as a length, may be dynamically adjusted to vary an RF characteristic, such as a polarization, resonant frequency, or mutual coupling between adjacent antennas. Any of a wide variety of alternative control and deployment devices may be utilized in conjunction with the presently described antenna assemblies secured to a tension member. For example, springs, hydraulics, and/or other control devices may be used to adjust the orientation of an antenna assembly and/or an associated antenna with respect to the ground, the aerial platform, and/or the tension member. The orientation of one or more of the antenna assemblies may be dynamically adjusted while being towed by an aerial platform. The orientation of one or more antenna assemblies may be dynamically adjusted relative to the tension member, a target surface, a received RF signal, and/or gravity and/or based on other RF characteristics.

Figure 18:
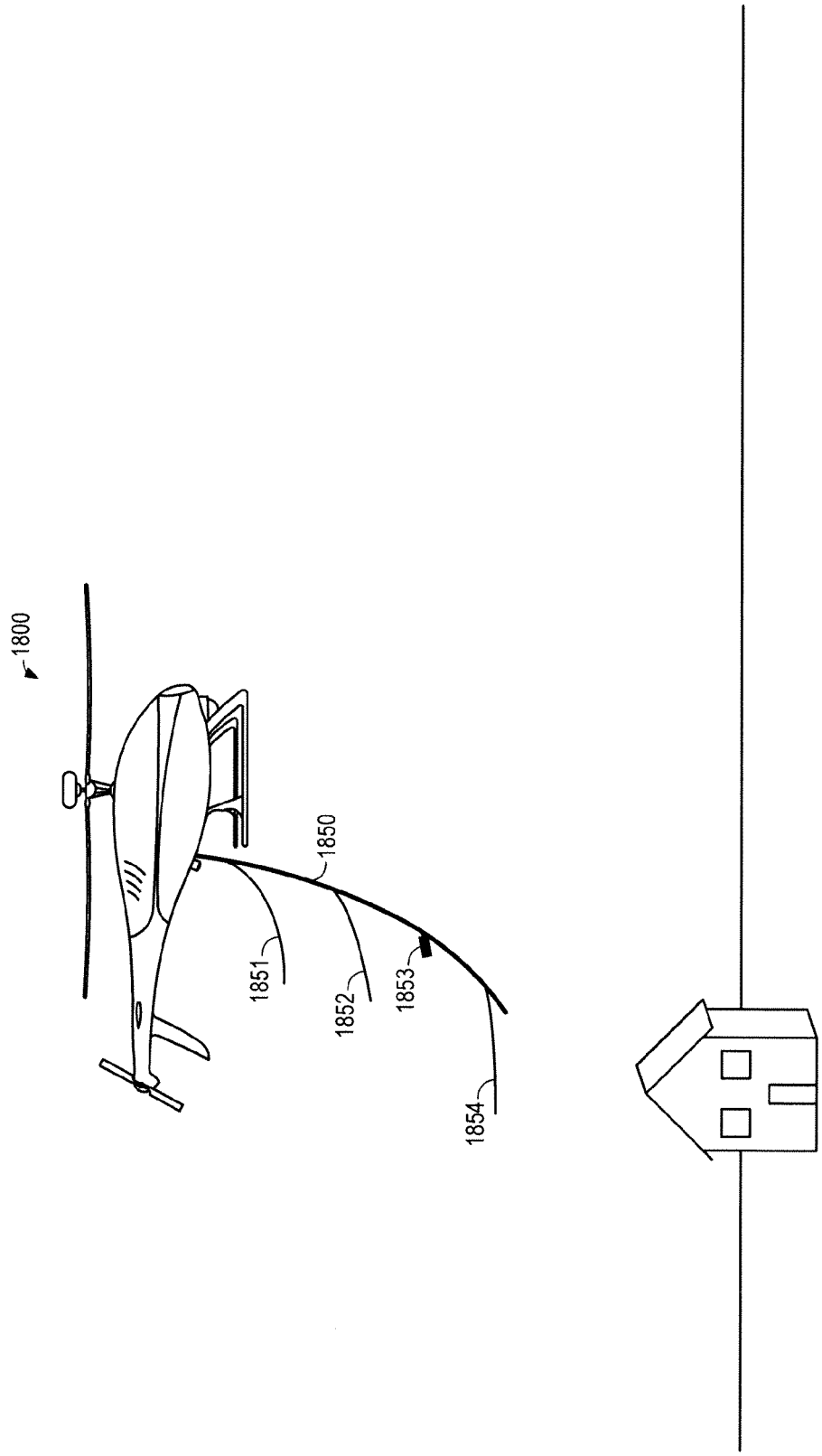
FIG. 18 illustrates an alternative aerial platform towing a plurality of antenna assemblies secured to a tension member.
Figure 19:
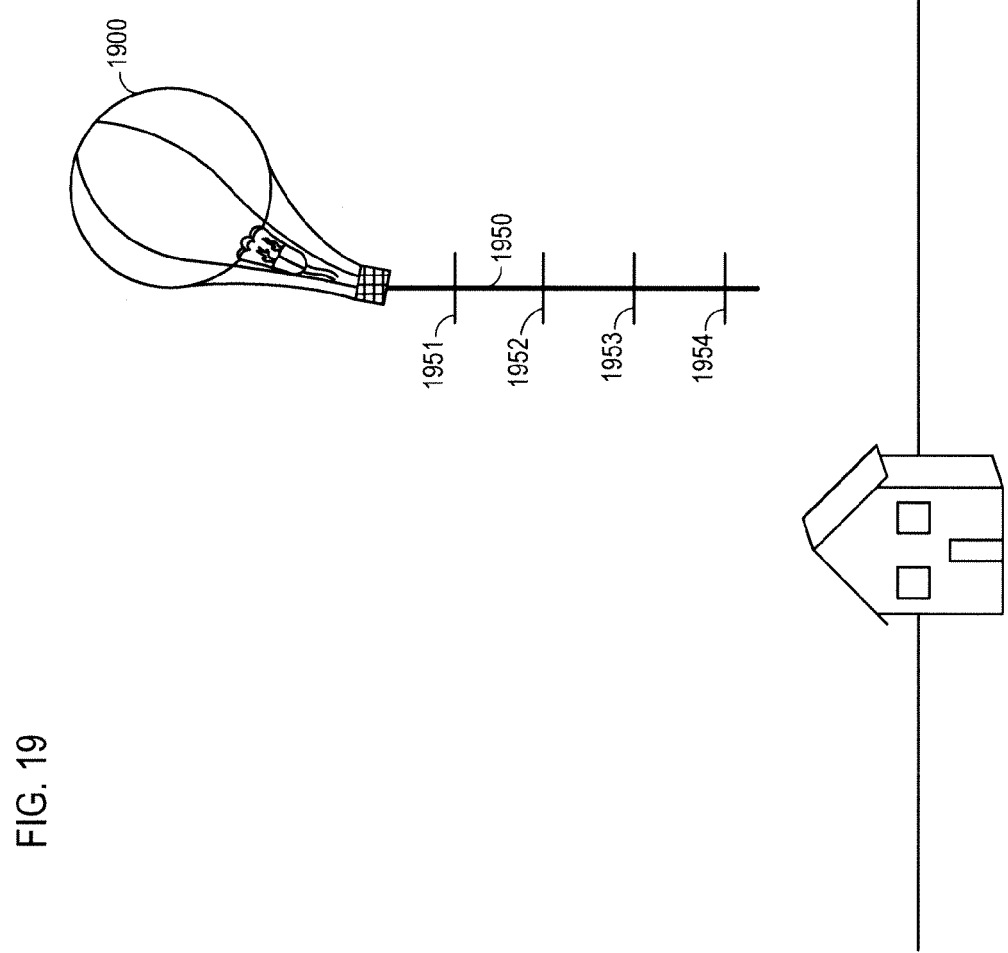
FIG. 19 illustrates another alternative aerial platform towing a plurality of antenna assemblies secured to a tension member.

FIG. 18 illustrates an alternative aerial platform, a helicopter 1800, towing a plurality of antenna assemblies 1851, 1852, 1853, and 1854 secured to a tension member 1850. Similarly, FIG. 19 illustrates another alternative aerial platform, a lighter-than-air vehicle 1900, towing a plurality of antennas 1951, 1952, 1953, and 1954 secured to a tension member 1950. In some embodiments, the lighter-than-air-vehicle 1900 may be propeller driven, or otherwise powered. An embodiment of the antenna system described herein may be particularly suited for applications with lighter-than-air-vehicles 1900 that are only capable of single pass (e.g., as driven by the wind), as the antenna system may be able to collect data from multiple elevations during the single pass. In some embodiments, the lighter-than-air-vehicle 1900, the antenna assemblies 1951-1954, and the tension member may be expendable. In such instances, the data collected by the antenna assemblies 1951-1954 may be stored for subsequent retrieval and/or transmitted to a remote receiver.

Figure 20:
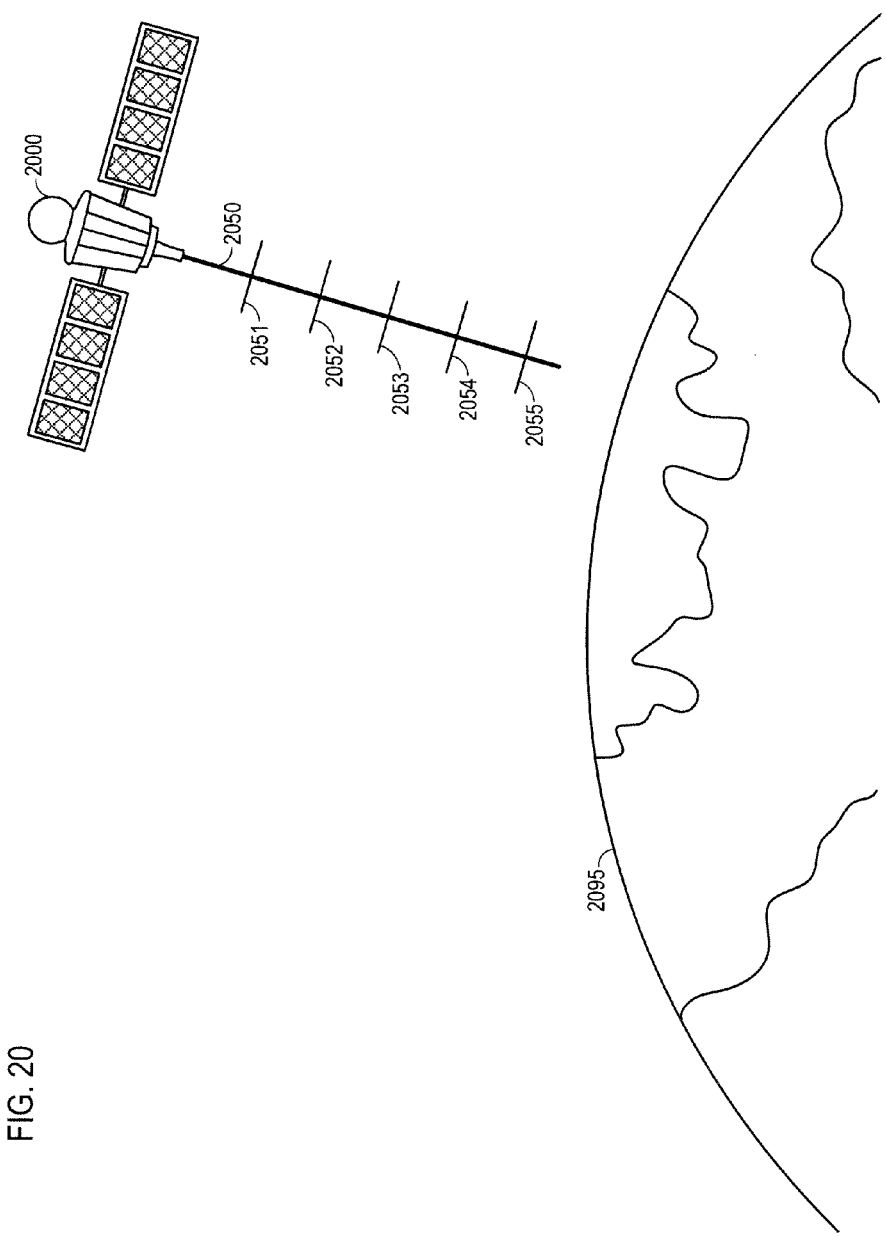
FIG. 20 illustrates an embodiment of a plurality of antenna assemblies secured along the length of a tension member secured to an orbiting satellite.

FIG. 20 illustrates an embodiment of an antenna system configured to be secured to a space vehicle, such as an orbiting satellite 2000. In the illustrated embodiment, a tension member 2050 may extend from the orbiting satellite toward a surface 2095. A plurality of antenna assemblies 2051, 2052, 2053, 2054, and 2055 may be secured along the length of the tension member 2050. The various systems, methods, components, location systems, communication systems, receiving systems, transmitters, and the like may be used in conjunction with the antenna system secured to an orbiting satellite 2000, as may be readily appreciated.

Figure 21:
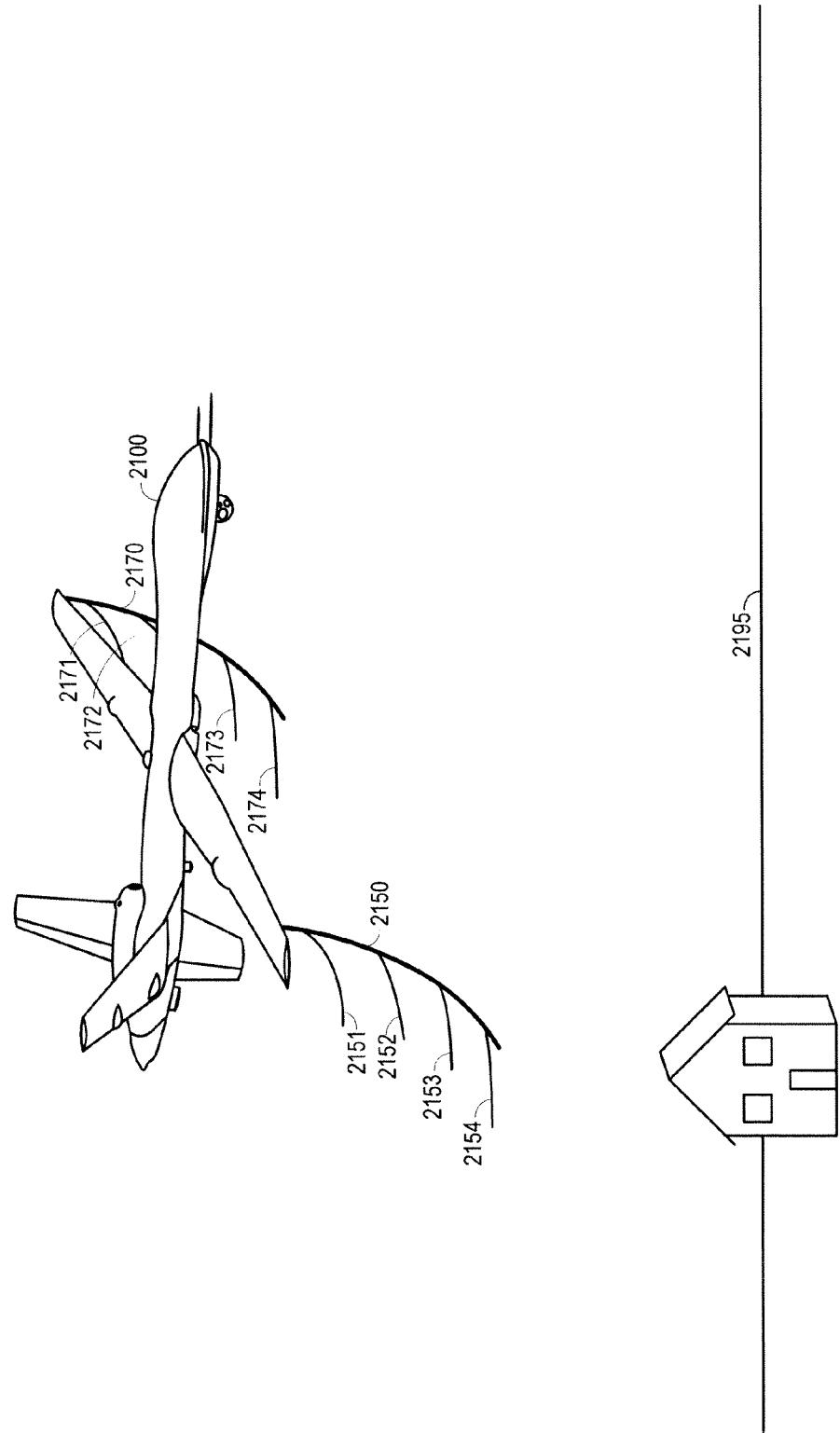
FIG. 21 illustrates multiple tension members secured to an aerial platform, each with a plurality of antenna assemblies secured along its length.

FIG. 21 illustrates multiple tension members 2150 and 2170 secured to an aerial platform 2100. In the illustrated embodiment, the antenna system may include two tension members 2150 and 2170, each with a plurality of antenna assemblies 2151-2154 and 2171-2174 secured along their respective lengths. Each tension member 2150 and 2170 and their corresponding plurality of antenna assemblies 2151-2154 and 2171-2174 may perform any of the various functions described herein. Similarly, any of the various systems, methods, devices, and/or features described in conjunction with a single tension member may be equally applied to a dual- or multi-tension member antenna system.

As illustrated, each tension member 2150 and 2170 may be spaced apart. In various embodiments, a plurality of tension members may be spaced apart in an in-track direction, in a cross-track direction (as illustrated), and/or at a unique orientation. Each tension member 2150 and 2170 may be configured to receive electromagnetic energy from and/or transmit electromagnetic energy to a distinct area of a target surface 2195, the same area of a target surface 2195, and/or overlapping areas of a target surface 2195.

Figure 22:
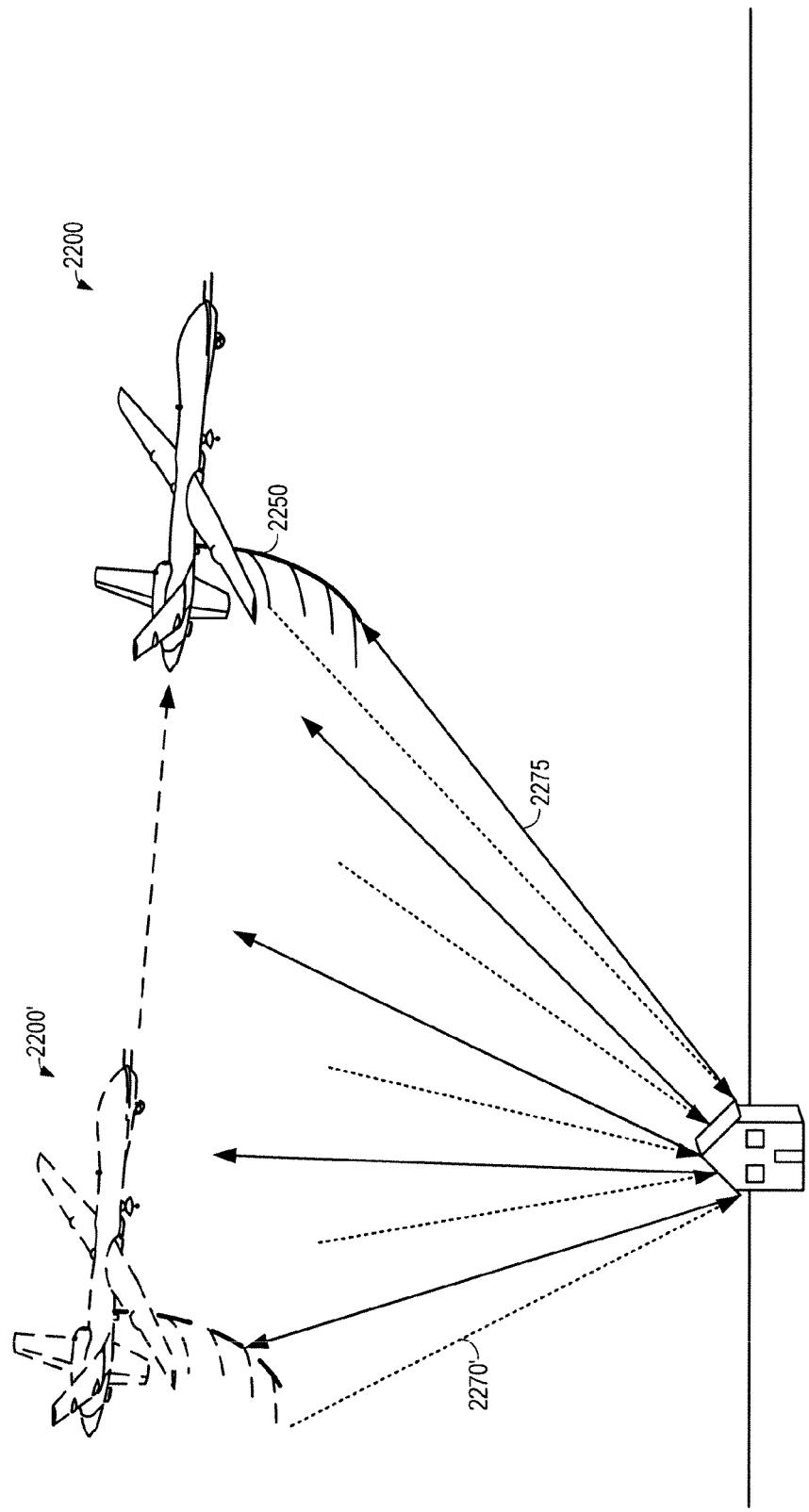
FIG. 22 illustrates an antenna system in use, with an aerial platform in motion synthesizing a horizontal aperture.

FIG. 22 illustrates a tension member 2250 with a plurality of antenna assemblies secured along its length (not labeled for clarity) for use in synthetic aperture radar. As illustrated, electromagnetic energy 2270' may be continuously or intermittently transmitted from an aerial platform as it moves from location 2200' to location 2200. Reflected signals 2275 may be received by each of the plurality of antennas associated with each antenna assembly at distinct elevations as the aerial platform moves from location 2200' to location 2200.

The reflected signals 2275 received by the multi-elevational antennas may be transmitted by a communication system to a receiving system, recorder, and/or SAR processor. In some embodiments, SAR processing, or other type of processing associated with any type of radio communication, radiolocation, and/or radar technique may be done in real-time. In other embodiments, processing may be performed subsequently using recorded data. Each received reflected signal 2275 may be associated with a time stamp of when it was received, a location of where the antenna was when it was received, a curvature of the tension member 2250 when it was received, and/or the elevation of the antenna when it was received. This information may be thought of as corresponding to a received signal at multiple elevations for each location between 2200' and 2200, or the equivalent of data collected by multiple passes of an aerial platform with a single-elevation antenna collecting SAR data.

Suitable embodiments of the antenna system may be used to implement any of a wide variety of radar remote sensing and/or imaging techniques, including particularly three-dimensional stereo or "multi-pass" SAR and interferometric SAR. Embodiments may be optimized for particular sensing or imaging techniques, for example by selecting vertical spacings between antennas to provide a desired set of interferometric or stereo imaging baselines. Embodiments of the antenna system can implement polarimetric and interferometric radars, multiband, wideband, and ultrawideband radars, impulse, chirped-pulse, or phase-encoded radars, foliage- or ground-penetrating radars, moving-target indicating radars, and many other types of radar. Embodiments of the antenna are potentially compatible with any radar or SAR processing technique applicable to single- or multi-pass data collection, including various image-forming techniques (Fourier, back-projection, etc.), autofocus techniques, resolution enhancement or superresolution techniques, speckle reduction techniques, and so on. Some embodiments may be optimized for specific processing techniques, for example by maintaining uniform vertical spacings and/or uniform horizontal offsets between antennas to simplify Fourier-transform processing.

Figure 23:
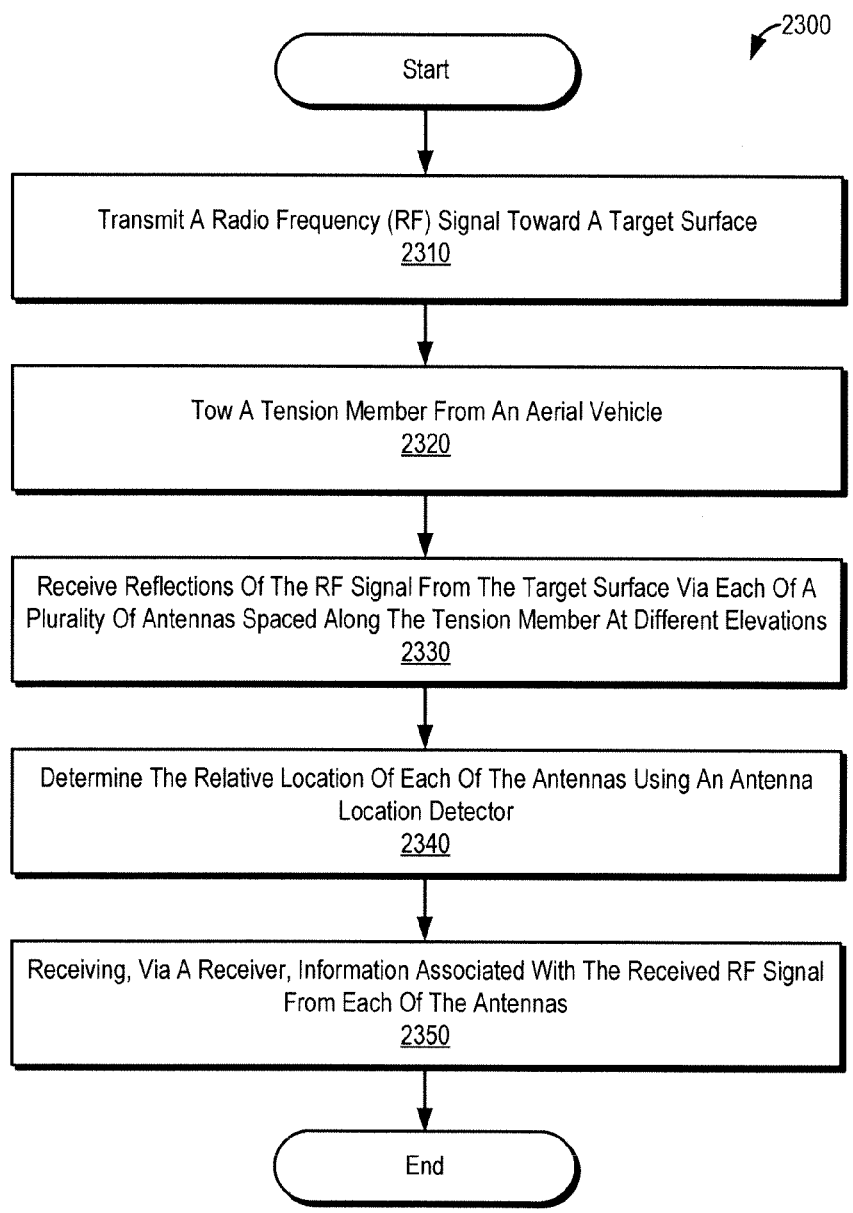
FIG. 23 illustrates a flow chart of a method for using an antenna system as described herein.

FIG. 23 illustrates a flow chart of a method 2300 for using an antenna system as described herein. As will be appreciated by one of skill in the art, various steps of the method may be performed out of order or more than once with respect to one or more of the other steps. As illustrated, a transmitter may be used to transmit an RF signal toward a target surface, at 2310. An aerial platform may be used to tow a tension member, at 2320. As described herein, any number of antennas and/or antenna assemblies may be secured along the length of the tension member at varying elevations. The transmitted RF signal may reflect off the target surface.

Each of the plurality of antennas at the varying elevations may receive portions of the reflected RF signal, at 2330. An antenna location system may determine the relative location (e.g., an elevation and/or a displacement) of each of the antennas and/or antenna assemblies, at 2340. A receiving system may receive, process, and/or record information associated with the received electromagnetic energy from each of the antennas, at 2350. For example, information associated with the actual received signal, a time stamp, a location of the antenna, a curvature of the tension member, an elevation of the antenna, and/or the like may be recorded, used for processing, and/or otherwise received by the receiving system.

Figure 24:
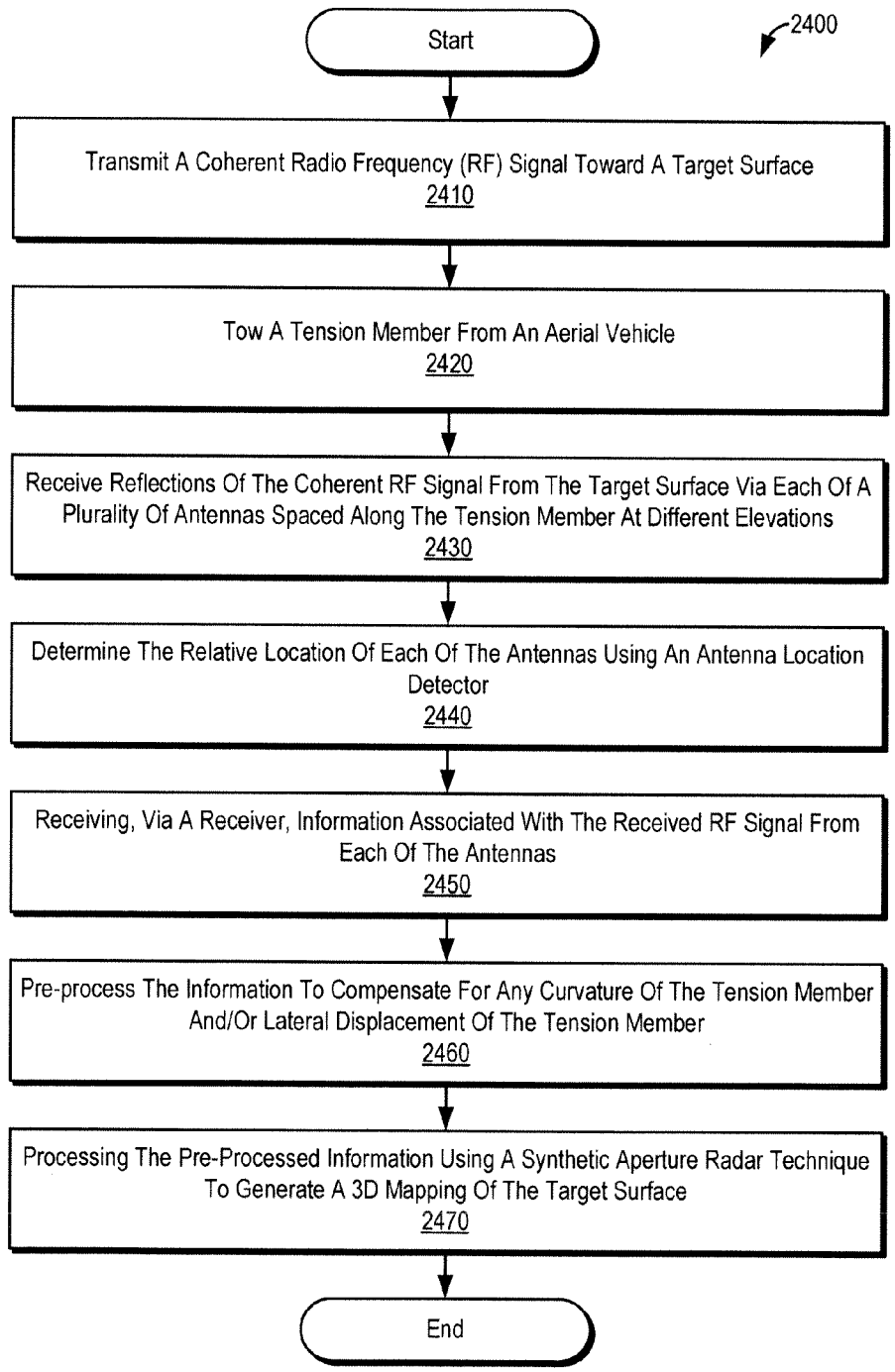
FIG. 24 illustrates a flow chart of a method for using the presently described antenna system in conjunction with multi-elevational 3D SAR.

FIG. 24 illustrates a flow chart of a more specific method 2400 of use for the presently described antenna system. As illustrated, a transmitter may transmit a coherent RF signal toward a target surface, at 2410. An aerial platform (or alternatively an orbiting satellite) may be used to tow a tension member, at 2420. Again, any number of antennas and/or antenna assemblies may be secured along the length of the tension member at varying elevations. The transmitted RF signal may reflect off the target surface.

Each of the plurality of antennas at the varying elevations may receive portions of the reflected RF signal, at 2430. An antenna location system may determine the relative location (e.g., an elevation and/or a displacement) of each of the antennas and/or antenna assemblies, at 2440. A receiving system may receive and/or record information associated with the received electromagnetic energy from each of the antennas, at 2450. For example, information associated with the actual received signal, a time stamp, a location of the antenna, a curvature of the tension member, an elevation of the antenna, and/or the like may be recorded and/or otherwise received by the receiving system.

The information may be pre-processed before storage, pre-processed in real-time by a SAR processor, and/or subsequently pre-processed to compensate for any curvature of the tension member and/or lateral (e.g., forward, aft, left, right) displacement of the tension member, at 2460. A real-time processor on the aerial platform, a real-time remote processor, and/or a subsequently used remote processor may process the pre-processed information using any one of the various SAR techniques described herein and/or another SAR technique to generate a 3D mapping of the target surface, at 2470.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. An antenna system configured for use with an orbiting satellite, comprising:
a tension member configured with a first end and a second end defining a length of the tension member, the first end configured to be secured to an orbiting satellite and the second end configured to be unsecured to the orbiting satellite and extend from the orbiting satellite at a different elevation than the first end;
a plurality of antenna assemblies secured to and spaced along the length of the tension member, each of the plurality of antenna assemblies including at least one antenna for use with electromagnetic energy; and
an antenna location system configured to determine a relative location of each of the plurality of antennas.

2. The antenna system of claim 1, wherein the plurality of antennas are configured to form a multistatic configuration with at least one external component.

3. The antenna system of claim 1, wherein each of the plurality of antenna assemblies is secured to and spaced along the length of the tension member at non-uniform intervals.

4. The antenna system of claim 1, wherein the plurality of antenna assemblies are secured to and spaced along the length of the tension member at intervals that correspond to desired elevational spacings.

5. The antenna system of claim 1, wherein each of the plurality of antennas is configured to receive electromagnetic energy.

6. The antenna system of claim 5, further comprising a receiving system configured to receive information associated with the received electromagnetic energy from each of the plurality of antennas.

7. The antenna system of claim 6, wherein the information associated with the received electromagnetic energy received by the receiving system comprises at least one of time information and phase information associated with the received electromagnetic energy received by each of the plurality of antennas.

8. The antenna system of claim 6, further comprising a communication link configured to communicatively connect each of the plurality of antennas to the receiving system, such that information may be transmitted from each of the plurality of antennas to the receiving system.

9. The antenna system of claim 8, wherein the communication link comprises an optical cable configured to allow each of the plurality of antennas to transmit information to the receiving system.

10. The antenna system of claim 8, wherein the communication link comprises free-space optical transmission network configured to allow each of the plurality of antennas to transmit information to the receiving system.

11. The antenna system of claim 1, wherein the length of the tension member is between 2 and 1000 wavelengths of a frequency.

12. The antenna system of claim 1, further comprising a control device configured to control a location of at least one of a plurality of points along the tension member relative to the orbiting satellite.

13. The antenna system of claim 1, wherein the antenna location system comprises an optical imaging device configured to capture an image of each of the plurality of antennas for use in determining the relative location of each of the plurality of antennas.

14. The antenna system of claim 1, wherein the antenna location system is configured to utilize a local positioning system (LPS) to determine the relative location of each of the plurality of antennas.

15. The antenna system of claim 1, wherein the antenna location system is configured to be calibrated using a known external signal to determine a phase center of each of the plurality of antennas.

16. The antenna system of claim 1, wherein at least one of the plurality of antennas comprises an active antenna.

17. The antenna system of claim 1, wherein at least one of the plurality of antennas comprises a flat antenna.

18. The antenna system of claim 1, wherein at least one of the plurality of antennas comprises a conformal antenna.

19. The antenna system of claim 1, wherein at least one of the plurality of antennas comprises an electronically steerable antenna, configured such that the physical antenna remains in a fixed form while a beam orientation of the physical antenna is electronically steerable.

20. The antenna system of claim 1, wherein the plurality of antennas includes multiple types of antennas.

21. The antenna system of claim 20, wherein the types of antennas are selected from the group of antenna types consisting of dipole antennas, Yagi-Uda antennas, horn antennas, planar waveguide antennas, bicone antennas, and parabolic reflectors.

22. The antenna system of claim 1, further comprising a fixation device configured to control an orientation of each of the plurality of antenna assemblies relative to the tension member.

23. The antenna system of claim 22, wherein the fixation device comprises passive fixation device configured to control the orientation of each of the plurality of antenna assemblies relative to the tension member.

24. The antenna system of claim 1, further comprising a fixation device configured to control an orientation of each of the plurality of antenna assemblies relative to the pull of gravity.

25. The antenna system of claim 1, wherein an orientation of at least one of the plurality of antenna assemblies relative to the pull of gravity is configured to be dynamically adjusted while secured to the orbiting satellite.

26. The antenna system of claim 1, wherein one of an orientation relative to the tension member and a position along the length of the tension members of one of the plurality of antenna assemblies is configured to be dynamically adjusted to improve reception of the electromagnetic energy while secured to the orbiting satellite.

27. The antenna system of claim 1, further comprising:
a second tension member configured with a first end and a second end defining a length of the tension member, the first end configured to be secured to the orbiting satellite and the second end configured to extend from the orbiting satellite unsecured to the orbiting satellite; and
a second plurality of antenna assemblies secured to and spaced along the length of the second tension member, each of the second plurality of antenna assemblies comprising at least one antenna configured to receive the electromagnetic energy from the surface, and
wherein the antenna location system is configured to determine a relative location of each of the second plurality of antennas.

28. A method for gathering synthetic aperture radar (SAR) data from multiple elevations using a single pass of an orbiting satellite, comprising:
transmitting electromagnetic energy toward a target surface;
securing a tension member to an orbiting satellite, the tension member configured with a first end and a second end defining a length of the tension member, the first end secured to the orbiting satellite and the second end unsecured to the orbiting satellite and extending from the orbiting satellite at a lower elevation than the first end;

receiving electromagnetic energy reflected by the target surface via each of a plurality of antennas associated with antenna assemblies secured to and spaced along the length of the tension member, each of the plurality of antennas configured to receive the electromagnetic energy;

determining a relative location of each of the plurality of antennas using an antenna location system;

connecting each of the plurality of antennas to a receiving system via a communication link, such that each of the plurality of antennas may transmit information to the receiving system; and receiving, via the receiving system, information associated with the received electromagnetic energy from each of the plurality of antennas.

29. The method of claim 28, further comprising retracting the tension member while the orbiting satellite is in flight.

30. The method of claim 29, further comprising sequentially removing each of the plurality of antenna assemblies from the tension member as the tension member is retracted.

31. The method of claim 29, wherein each of the plurality of antenna assemblies is configured to transition to a storage position as the tension member is retracted.

32. The method of claim 28, further comprising controlling a location of the second end of the tension member relative to the orbiting satellite using a control device.

33. The method of claim 32, wherein the control device is configured to be passively controlled.

34. The method of claim 32, wherein the control device is configured to be actively controlled.

35. The method of claim 34, wherein the control device comprises a propulsion system.

36. The method of claim 35, wherein the propulsion system is configured to be powered via an electrical conducting cable.

37. The method of claim 36, wherein the electrical conducting cable comprises a plurality of resonant traps configured to divide the electrical conducting cable into a series of electrical lengths tending not to interact electromagnetically with the antennas.

38. The method of claim 37, wherein at least one of the plurality of resonant traps comprises a ferrite component configured to block common-mode induced currents but pass balanced currents.

39. The method of claim 28, wherein the antenna location system comprises a curvature sensing optical fiber system configured to provide information indicating the curvature of the tension member at at least one location along the length of the tension member.

40. The method of claim 28, wherein at least one of the plurality of antennas comprises an active antenna.

41. The method of claim 28, further comprising a fixation device configured to control an orientation of each of the plurality of antenna assemblies relative to the tension member.

42. A method for gathering synthetic aperture radar (SAR) data from multiple elevations using a single pass of an orbiting satellite, comprising:

transmitting electromagnetic energy toward a target surface;

securing a tension member to an orbiting satellite, the tension member configured with a first end and a second end defining a length of the tension member, the first end secured to the orbiting satellite and the second end unsecured to the orbiting satellite and extending from the orbiting satellite at a lower elevation than the first end;

receiving electromagnetic energy reflected by the target surface via each of a plurality of antennas associated with antenna assemblies secured to and spaced along the length of the tension member, each of the plurality of antennas configured to receive the electromagnetic energy;

determining a relative location of each of the plurality of antennas using an antenna location system;

connecting each of the plurality of antennas to a receiving system via a communication link, such that each of the plurality of antennas may transmit information to the receiving system; and receiving, via the receiving system, information associated with the received electromagnetic energy from each of the plurality of antennas, wherein the antenna location system is configured to utilize a known length of the tension member to determine the relative location of each of the plurality of antennas.

* * * * *

UNITED STATES PATENT AND TRADEMARK OFFICE
CERTIFICATE OF CORRECTION

PATENT NO. : 9,240,628 B2  
APPLICATION NO. : 13/915425  
DATED : January 19, 2016  
INVENTOR(S) : William D. Duncan et al.

It is certified that error appears in the above-identified patent and that said Letters Patent is hereby corrected as shown below:

In the claims,

Column 21, line 49, claim 10: "link comprises free-space optical transmission" should read --link comprises a free-space optical transmission--

Signed and Sealed this  
Third Day of May, 2016

Michelle K. Lee  
*Director of the United States Patent and Trademark Office*